(12) United States Patent
Aoki et al.

(10) Patent No.: US 10,705,530 B2
(45) Date of Patent: Jul. 7, 2020

(54) VEHICLE TRAVEL CONTROL METHOD AND VEHICLE TRAVEL CONTROL DEVICE

(71) Applicant: Nissan Motor Co., Ltd., Yokohama-shi, Kanagawa (JP)

(72) Inventors: Motonobu Aoki, Kanagawa (JP); Susumu Fujita, Kanagawa (JP); Yohei Mishina, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 24 days.

(21) Appl. No.: 16/072,733

(22) PCT Filed: Jan. 4, 2017

(86) PCT No.: PCT/JP2017/000047
§ 371 (c)(1),
(2) Date: Jul. 25, 2018

(87) PCT Pub. No.: WO2017/130641
PCT Pub. Date: Aug. 3, 2017

(65) Prior Publication Data
US 2019/0033876 A1 Jan. 31, 2019

(30) Foreign Application Priority Data

Jan. 29, 2016 (JP) ................................. 2016-015807

(51) Int. Cl.
*G05D 1/02* (2020.01)
*G08G 1/16* (2006.01)
(Continued)

(52) U.S. Cl.
CPC ........... *G05D 1/0214* (2013.01); *B60W 30/09* (2013.01); *B60W 30/0953* (2013.01);
(Continued)

(58) Field of Classification Search
CPC .... G05D 1/0214; G05D 1/027; G05D 1/0272; G08G 1/0112; G08G 1/16; G08G 1/166; B60W 30/09; B60W 30/0953
See application file for complete search history.

(56) References Cited

U.S. PATENT DOCUMENTS 6,724,920 B1 * 4/2004 Berenz ............... G06K 9/00221
180/169
9,805,601 B1 * 10/2017 Fields .............. G08G 1/096791
(Continued)

FOREIGN PATENT DOCUMENTS

JP H11301343 A 11/1999
JP 2009271766 A 11/2009
(Continued)

*Primary Examiner* — Behrang Badii
*Assistant Examiner* — Daniel L Greene
(74) *Attorney, Agent, or Firm* — Young Basile Hanlon & MacFarlane, P.C.

(57) ABSTRACT

A travel control for a vehicle includes specifying a pedestrian crosswalk through which a subject vehicle is expected to pass as a first pedestrian crosswalk, estimating a position on the first pedestrian crosswalk through which the subject vehicle passes as a crossing position in the length direction of the first pedestrian crosswalk, specifying another pedestrian crosswalk located within a predetermined distance from the crossing position and located close to the first pedestrian crosswalk as a second pedestrian crosswalk, setting an area including the first pedestrian crosswalk and the second pedestrian crosswalk as a detection area of a detector detecting an object around the subject vehicle, detecting a moving object in the detection area using the detector, and controlling travel of the subject vehicle on the basis of a detection result of the detector.

13 Claims, 14 Drawing Sheets

(51) Int. Cl.
*B60W 30/095* (2012.01)
*B60W 30/09* (2012.01)
*G08G 1/01* (2006.01)

(52) U.S. Cl.
CPC ......... *B60W 30/0956* (2013.01); *G05D 1/027* (2013.01); *G05D 1/0272* (2013.01); *G08G 1/0112* (2013.01); *G08G 1/16* (2013.01); *G08G 1/166* (2013.01); *B60W 2520/10* (2013.01); *B60W 2552/00* (2020.02); *B60W 2554/00* (2020.02); *B60W 2554/80* (2020.02); *B60W 2556/50* (2020.02); *G05D 2201/0213* (2013.01)

(56) References Cited

U.S. PATENT DOCUMENTS

| | | | |
|---|---|---|---|
| 2012/0185160 A1 | 7/2012 | Kumabe | |
| 2013/0013184 A1 | 1/2013 | Morotomi et al. | |
| 2014/0297116 A1* | 10/2014 | Anderson | H02K 5/12 |
| | | | 701/37 |
| 2016/0339959 A1* | 11/2016 | Lee | B62D 15/0265 |
| 2016/0362050 A1* | 12/2016 | Lee | B60R 1/00 |
| 2017/0003134 A1* | 1/2017 | Kim | B60R 1/00 |
| 2017/0036673 A1* | 2/2017 | Lee | A61B 3/112 |
| 2018/0033306 A1* | 2/2018 | Kim | G08G 1/005 |

FOREIGN PATENT DOCUMENTS

| | | |
|---|---|---|
| JP | 2012160166 A | 8/2012 |
| JP | 2013105201 A | 5/2013 |
| WO | 2011086661 A1 | 7/2011 |

\* cited by examiner

VEHICLE TRAVEL CONTROL METHOD AND VEHICLE TRAVEL CONTROL DEVICE

CROSS-REFERENCE TO RELATED APPLICATION

The present application claims priority to Japanese Patent Application No. 2016-015807 filed Jan. 29, 2016, the entire content of which is herein incorporated by reference.

TECHNICAL FIELD

The present invention relates to a travel control method for a vehicle and a travel control apparatus for a vehicle.

BACKGROUND

Heretofore known in the art is a technique of estimating whether or not a moving object crossing a pedestrian crosswalk and a subject vehicle come close to each other (WO2011/086661).

The prior art is, however, to detect only a moving object crossing a pedestrian crosswalk located ahead. Thus, an object before crossing the pedestrian crosswalk, that is, an object that may move to come close to the subject vehicle when the subject vehicle approaches the pedestrian crosswalk, cannot be detected before the subject vehicle comes close to the pedestrian crosswalk. This may be problematic.

SUMMARY

A problem to be solved by the present invention is to provide a travel control method for a vehicle and a travel control apparatus for a vehicle with which an object that may move to come close to the subject vehicle when the subject vehicle approaches a pedestrian crosswalk can be appropriately detected before the subject vehicle comes close to the pedestrian crosswalk.

The present invention solves the above problem by specifying a pedestrian crosswalk through which a subject vehicle is expected to pass as a first pedestrian crosswalk, estimating a position at which the subject vehicle passes through the first pedestrian crosswalk as a crossing position, specifying another pedestrian crosswalk located within a predetermined first distance from the crossing position as a second pedestrian crosswalk, and setting an area including at least the first pedestrian crosswalk and the second pedestrian crosswalk as a detection area of a detector.

According to the present invention, the area including the second pedestrian crosswalk close to the first pedestrian crosswalk is set as the detection area of the detector and, therefore, an object that may move to come close to the subject vehicle when the subject vehicle approaches a pedestrian crosswalk can be appropriately detected before the subject vehicle comes close to the pedestrian crosswalk.

DETAILED DESCRIPTION

Hereinafter, one or more embodiments of the present invention will be described with reference to the drawings. In the embodiments, a travel control apparatus for a vehicle equipped in the vehicle will be exemplified and described.

First Embodiment

Figure 1:
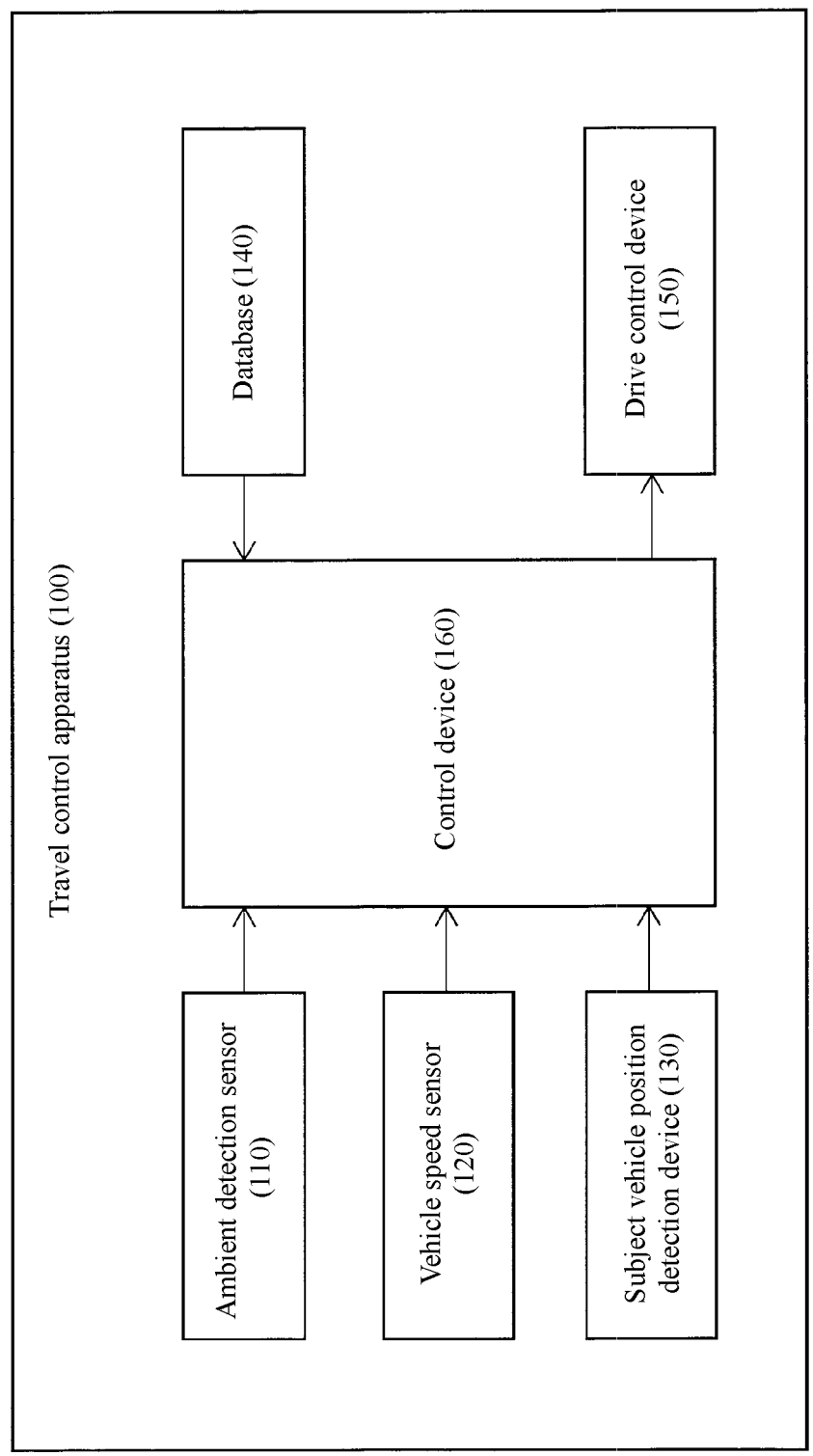
FIG. 1 is a block diagram illustrating a travel control apparatus for a vehicle according to one or more embodiments of the present invention.

FIG. 1 is a block diagram illustrating the configuration of a travel control apparatus for a vehicle 100 according to an embodiment of the present invention. As illustrated in FIG. 1, the travel control apparatus for a vehicle 100 according to the present embodiment includes an ambient detection sensor 110, a vehicle speed sensor 120, a subject vehicle position detection device 130, a database 140, a drive control device 150, and a control device 160. These devices are connected to one another via a controller area network (CAN) or other in-vehicle LAN for mutually exchanging information.

The ambient detection sensor 110 detects objects existing around the subject vehicle. Examples of such an ambient detection sensor 110 include a front camera that captures images ahead of the subject vehicle, a rear camera that captures images behind the subject vehicle, a front radar that detect obstacles ahead of the subject vehicle, a rear radar that detects obstacles behind the subject vehicle, and side radars that detect obstacles existing on the sides of the subject vehicle. Examples of the objects detected by the ambient detection sensor 110 include pedestrians, bicycles, motorbikes, cars, obstacles on a road, traffic signals, road surface signs, and pedestrian crosswalks. The ambient detection sensor 110 may be configured using one sensor of the above-described sensors or may also be configured using a combination of two or more sensors. The detection results of the ambient detection sensor 110 are output to the control device 160.

The vehicle speed sensor 120 measures the rotational speed of a drive system such as a drive shaft or a wheel and detects the traveling speed of the vehicle (also referred to as a "vehicle speed," hereinafter) on the basis of the measured rotational speed. The vehicle speed information detected by the vehicle speed sensor 120 is output to the control device 160.

The subject vehicle position detection device 130 is composed of a GPS unit, a gyro-sensor, and other necessary components. The subject vehicle position detection device 130 detects radio waves transmitted from a plurality of communication satellites using the GPS unit to periodically acquire positional information of the subject vehicle and detects the current position of the subject vehicle on the basis of the acquired positional information of the subject vehicle, angle variation information acquired from the gyro-sensor, and the vehicle speed acquired from the vehicle speed sensor 120. The positional information of the subject vehicle detected by the subject vehicle position detection device 130 is output to the control device 160.

Figure 2:
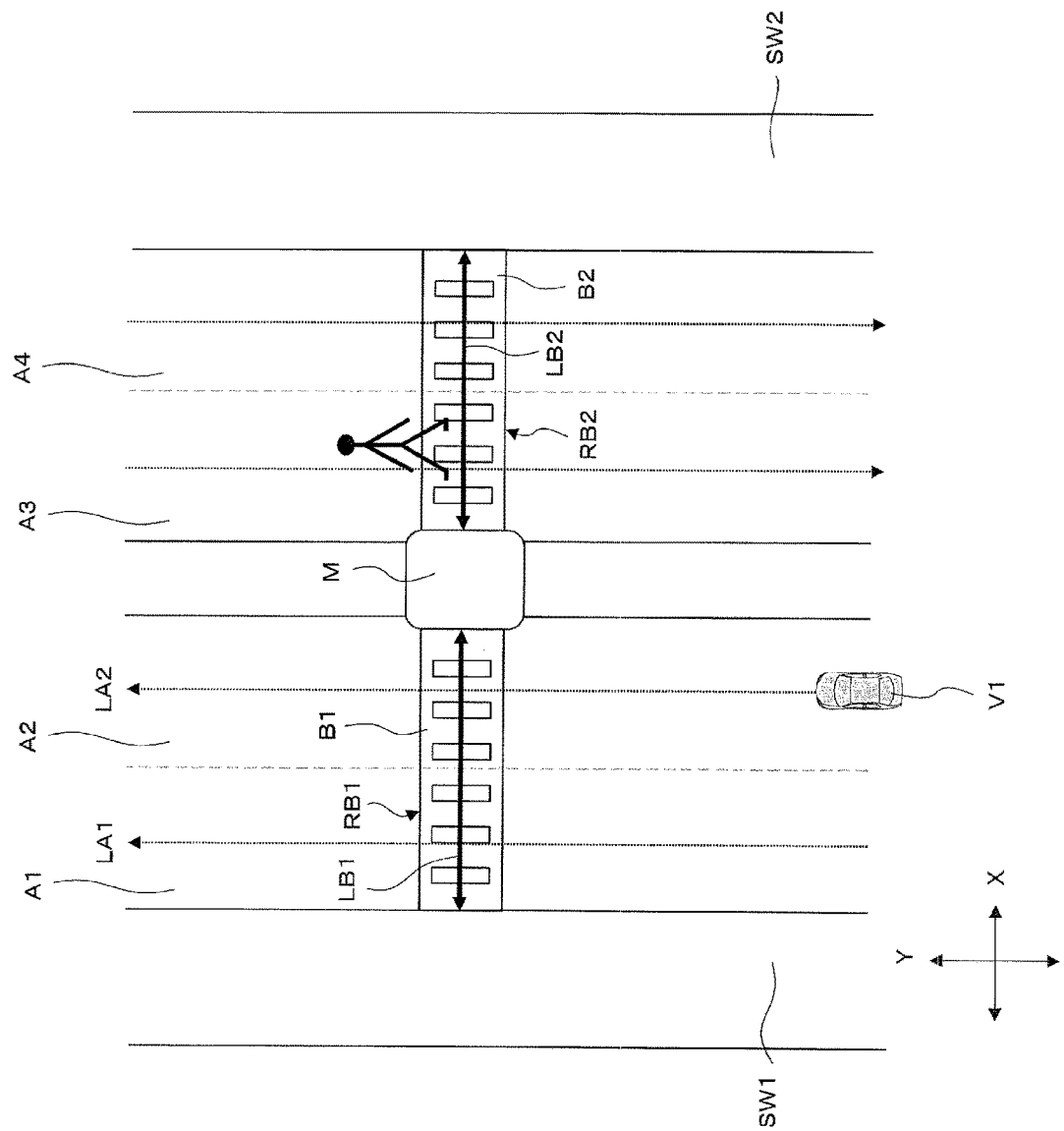
FIG. 2 is a diagram illustrating an example of link information and area information of pedestrian crosswalks possessed by map information.

The database 140 stores map information. The map information includes link information of each of a road on which the vehicle travels, a sidewalk, and a pedestrian crosswalk. FIG. 2 is a diagram for describing the link information of the map information. The link information of a road on which the vehicle travels has one or more links and one or more nodes of each lane as the link information. For example, in the example illustrated in FIG. 2, each of links LA1 to LA4 of lanes A1 to A4 is stored in the database 140 as the link information of a road on which the subject vehicle V1 travels. The link information of each pedestrian crosswalk has one or more links extending in the length direction of the pedestrian crosswalk (i.e. crossing direction of a moving object such as a pedestrian or a bicycle crossing the pedestrian crosswalk) as the link information. In addition, the database 140 has information on lane boundary lines (such as lane marks and curbstones), stop lines, guardrails, road shapes, road curvatures, etc. as the map information. For example, in the example illustrated in FIG. 2, links LB1 and LB2 of pedestrian crosswalks B1 and B2 are stored in the database 140 as the link information of the pedestrian crosswalks.

The map information stored in the database 140 also includes area information of pedestrian crosswalks on the map. The shape of the area of a pedestrian crosswalk is not limited to a rectangular shape and may also be other polygonal shape. For example, in the example illustrated in FIG. 2, area information such as the positions and shapes of areas RB1 and RB2 occupied by the pedestrian crosswalks B1 and B2 on the map are stored in the database 140. The map information stored in the database 140 also includes information on road configurations other than pedestrian crosswalks. Examples of such information on road configurations include information on sidewalks, roadside strips, and median strips. For example, in the example illustrated in FIG. 2, sidewalks SW1 and SW2 and a median strip M are stored in the database 140 as the information on the road configurations. The map information stored in the database 140 is appropriately referred to by the control device 160.

The drive control device 150 controls travel of the subject vehicle. For example, when the subject vehicle is controlled to follow a preceding vehicle (this control will be referred to as "follow-up travel control," hereinafter), the drive control device 150 controls the operation of a drive mechanism (which includes the operation of an internal-combustion engine in the case of an engine car and the operation of an electric motor in the case of an electric car or the like and further includes the torque distribution for an internal-combustion engine and an electric motor in the case of a hybrid car) and the braking operation to achieve the acceleration, deceleration and vehicle speed so that the distance between the subject vehicle and the preceding vehicle can be maintained at a constant distance. When the subject vehicle performs right or left turn, lane change, or the like, the drive control device 150 controls the operation of a steering actuator to control the operation of wheels and thereby executes the steering control of the subject vehicle. The drive control device 150 controls travel of the subject vehicle in accordance with commands sent from the control device 160, which will be described below. Other well-known methods can also be used as a travel control method by the drive control device 150.

The control device 160 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used as an operating circuit.

The control device 160 executes the programs stored in the ROM using the CPU thereby to achieve the following various functions: a subject vehicle information acquisition function of acquiring information on the subject vehicle; an ambient information acquisition function of acquiring the detection results of the ambient detection sensor 110; a route search function of searching for a planned travel route of the subject vehicle; a first pedestrian crosswalk specifying function of specifying a pedestrian crosswalk through which the subject vehicle is expected to pass as a first pedestrian crosswalk; a crossing position estimation function of estimating a crossing position at which the subject vehicle passes through the first pedestrian crosswalk; a first distance calculation function of calculating a distance in which a moving object moves until the subject vehicle reaches the first pedestrian crosswalk as a first distance; a second pedestrian crosswalk specifying function of specifying a pedestrian crosswalk located within the first distance from the crossing position as a second pedestrian crosswalk; an interpolation area setting function of setting an interpolation combining the first pedestrian crosswalk and the second pedestrian crosswalk; a detection area setting function of setting an area including the first pedestrian crosswalk, the second pedestrian crosswalk, and the interpolation area as a detection area; a moving object detection function of detecting a moving object in the detection area; and a travel control function of controlling travel of the subject vehicle on the basis of the moving object detected in the detection area. These functions of the control device 160 will be described below.

The subject vehicle information acquisition function of the control device 160 is a function capable of acquiring information regarding the subject vehicle as the subject vehicle information. Specifically, the control device 160 can use the subject vehicle information acquisition function to acquire the vehicle speed information of the subject vehicle from the vehicle speed sensor 120 as the subject vehicle information. In addition or alternatively, the control device 160 can use the subject vehicle information acquisition function to acquire information on the current position of the subject vehicle from the subject vehicle position detection device 130 as the subject vehicle information.

The ambient information acquisition function of the control device 160 is a function capable of acquiring the detection results of the ambient detection sensor 110 as the ambient information. For example, the control device 160 can use the ambient information acquisition function to acquire the image information outside the vehicle captured by the front camera and the rear camera and/or the detection results by the front radar, rear radar, and side radars as the ambient information. In addition or alternatively, the control device 160 can use the ambient information acquisition function to perform image analysis on the image information acquired from the cameras and/or perform a clustering process on the point cloud information detected by the radars, thereby acquiring information on the position and/or moving speed of an object existing around the subject vehicle, etc., as the ambient information.

The route search function of the control device 160 is a function capable of searching for a planned travel route of the subject vehicle. For example, when the driver inputs a destination via an input device (not illustrated), the control device 160 can use the route search function to search for a planned travel route of the subject vehicle on the basis of the destination input by the driver, the map information stored in the database 140, and the positional information of the subject vehicle detected by the subject vehicle position detection device 130. The database 140 according to the present embodiment stores the link information of each lane as in the example illustrated in FIG. 2. The link or links of each lane are preliminarily weighted in accordance with the travel distance, road situation, etc. of the lane (for example, the weighting of links increases as the distance increases or the road situation deteriorates). The control device 160 can use the route search function to specify a lane that is suitable for the travel route from the current position of the subject vehicle to the destination, for example, and correct the weighting of links of the specified lane. For example, when right turn is required to arrive at the destination, the weighting of links of the lane for right turn can be corrected to decrease. Then, the control device 160 can use the route search function to search for a planned travel route that is a route at a lane level in which the total sum of weighting of links is minimum in the lane from the current position of the subject vehicle to the destination, using a graph search algorithm such as Dijkstra's algorithm or A* (A-star) algorithm.

The first pedestrian crosswalk specifying function of the control device 160 is a function capable of specifying a pedestrian crosswalk through which the subject vehicle is expected to pass as a first pedestrian crosswalk on the basis of the planned travel route searched using the route search function and the map information stored in the database 140. For example, the control device 160 can use the first pedestrian crosswalk specifying function to refer to the map information stored in the database 140, thereby acquiring the area information of a pedestrian crosswalk represented by a polygonal shape. Then, when the link of a lane representing the planned travel route of the subject vehicle intersects with the area of a pedestrian crosswalk, the control device 160 can specify the pedestrian crosswalk as the first pedestrian crosswalk using the first pedestrian crosswalk specifying function. For example, in the example illustrate in FIG. 2, the link LA2 of the lane A2 representing the planned travel route of the subject vehicle V1 intersects with the area RB1 of the pedestrian crosswalk B1, and the pedestrian crosswalk B1 is therefore specified as the first pedestrian crosswalk. On the other hand, in the example illustrate in FIG. 2, the link LA2 of the lane A2 representing the planned travel route of the subject vehicle V1 does not intersect with the area RB2 of the pedestrian crosswalk B2, and the pedestrian crosswalk B2 is therefore not specified as the first pedestrian crosswalk.

The method of specifying the first pedestrian crosswalk is not limited to the above method. For example, when the link of a lane determined as the planned travel route of the subject vehicle intersects with the link of a pedestrian crosswalk, the control device 160 can specify the pedestrian crosswalk as the first pedestrian crosswalk using the first pedestrian crosswalk specifying function. For example, in the example illustrate in FIG. 2, the link LA2 of the lane A2 representing the planned travel route of the subject vehicle V1 intersects with the link LB1 of the pedestrian crosswalk B1, and the pedestrian crosswalk B1 is therefore specified as the first pedestrian crosswalk. On the other hand, in the example illustrate in FIG. 2, the link LA2 of the lane A2 representing the planned travel route of the subject vehicle V1 does not intersect with the link LB2 of the pedestrian crosswalk B2, and the pedestrian crosswalk B2 is therefore not specified as the first pedestrian crosswalk. In addition or alternatively, the control device 160 may be configured to use the first pedestrian crosswalk specifying function to acquire an image captured ahead of the subject vehicle from the camera, which captures images ahead of the subject vehicle V1, and perform image analysis thereby to specify the first pedestrian crosswalk.

Figure 3:
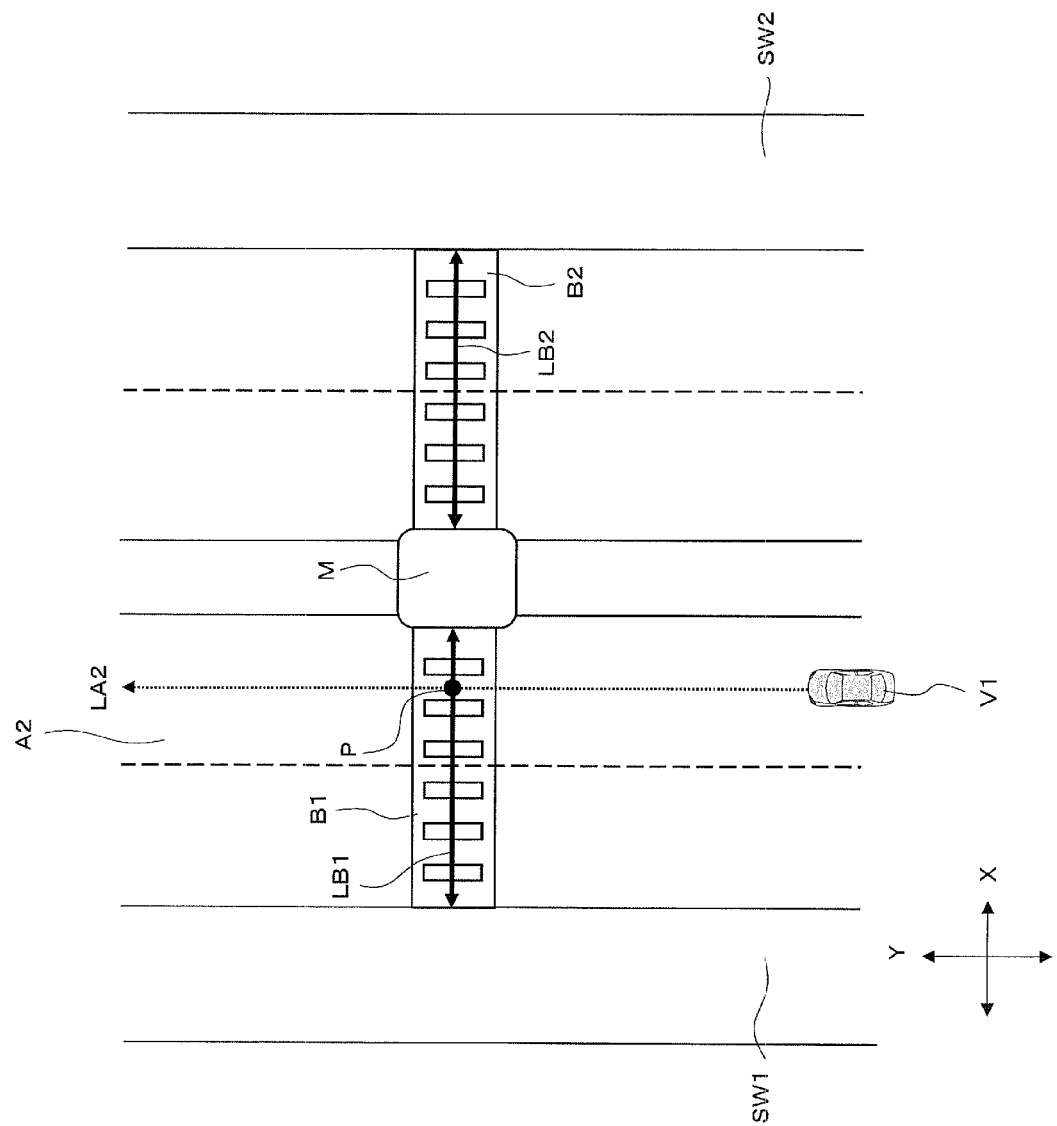
FIG. 3 is a diagram for describing an example of a method of estimating a crossing position.

The crossing position estimation function of the control device 160 is a function capable of estimating a position on the first pedestrian crosswalk through which the subject vehicle passes as a crossing position in the length direction of the first pedestrian crosswalk. Specifically, the control device 160 can use the crossing position estimation function to estimate a point of intersection between the planned travel route of the subject vehicle and the moving route of a moving object crossing the first pedestrian crosswalk as the crossing position. The control device 160 can use the crossing position estimation function to refer to the map information stored in the database 140 and acquire the link of the first pedestrian crosswalk as the moving route of the moving object crossing the first pedestrian crosswalk. FIG. 3 is a diagram for describing an example of a method of estimating the crossing position. For example, in the example illustrated in FIG. 3, the control device 160 can use the crossing position estimation function to estimate the position of a point of intersection P between the link LA2 of the lane A2 representing the planned travel route of the subject vehicle V1 and the link LB1 of the first pedestrian crosswalk B1 as the crossing position.

The first distance calculation function of the control device 160 is a function capable of calculating a distance in which a moving object (object crossing a pedestrian crosswalk, such as a pedestrian or a bicycle) moves until the subject vehicle reaches the first pedestrian crosswalk as a first distance. Specifically, the control device 160 can use the first distance calculation function to calculate the first distance on the basis of the moving speed of the moving object and an estimated time for arrival for the subject vehicle to reach the crossing position. For example, the control device 160 can use the first distance calculation function to refer to the map information to calculate a distance D from the current position of the subject vehicle to the crossing position P. Then, the control device 160 can use the first distance calculation function to divide the distance D to the crossing position P by the vehicle speed V of the subject vehicle thereby to calculate an estimated time for arrival T ($T=D/V$) for the subject vehicle to reach the crossing position P. The control device 160 can further use the first distance calculation function to read a moving speed Vp of a moving object from the ROM of the control device 160. In the present embodiment, an average moving speed (e.g. 80 m/min) of pedestrians is stored in the ROM of the control device 160, and the control device 160 can use the first distance calculation function to acquire the average moving speed of pedestrians stored in the ROM of the control device 160 as the moving speed Vp of a moving object. The moving speed of a moving object is not limited to the average moving speed of pedestrians. For example, the average moving speed of bicycles may also be used as the moving speed of a moving object. In a pedestrian crosswalk with frequent traffic of aged pedestrians, the average moving speed of pedestrians such as aged pedestrians having a relatively low moving speed may be used as the moving speed of a moving object. Then, the control device 160 can use the first distance calculation function to multiply the time for arrival T, which is required for the subject vehicle to reach the first pedestrian crosswalk, by the moving speed Vp of a moving object, thereby calculating the first distance D1 (D1=T×Vp).

Figure 4:
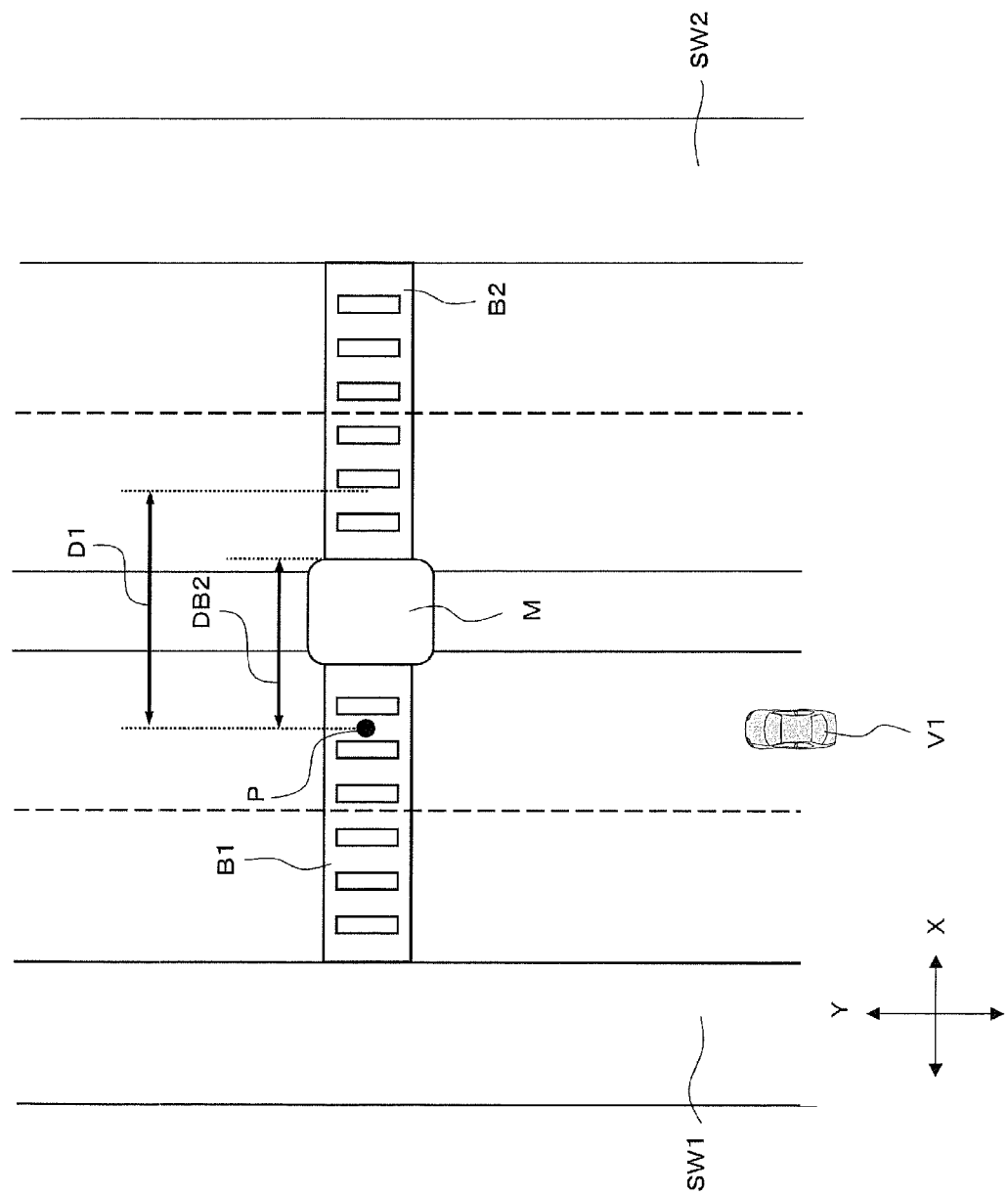
FIG. 4 is a diagram for describing an example of a method of specifying a second pedestrian crosswalk.

The second pedestrian crosswalk specifying function of the control device 160 is a function capable of specifying a pedestrian crosswalk located within the first distance from the crossing position and located close to the first pedestrian crosswalk as a second pedestrian crosswalk. Specifically, among pedestrian crosswalks close to the first pedestrian crosswalk, a pedestrian crosswalk to which the distance from the crossing position in the length direction of the first pedestrian crosswalk (direction along the link of the first pedestrian crosswalk) is the first distance or less is specified as the second pedestrian crosswalk. FIG. 4 is a diagram for describing a method of specifying the second pedestrian crosswalk. For example, in the example illustrated in FIG. 4, the pedestrian crosswalk B1 is specified as the first pedestrian crosswalk, and another pedestrian crosswalk B2 exists in the vicinity of the first pedestrian crosswalk. In the example illustrated in FIG. 4, the pedestrian crosswalk B2 is specified as the second pedestrian crosswalk because the distance DB2 from the crossing position P to the pedestrian crosswalk B2 in the length direction (X-direction) of the first pedestrian crosswalk B1 is not more than the first distance D1. On the other hand, although not illustrated, when the distance from the crossing position P to a pedestrian crosswalk is not less than the first distance D1, the control device 160 uses the second pedestrian crosswalk specifying function so as not to specify the pedestrian crosswalk as the second pedestrian crosswalk.

Figure 5:
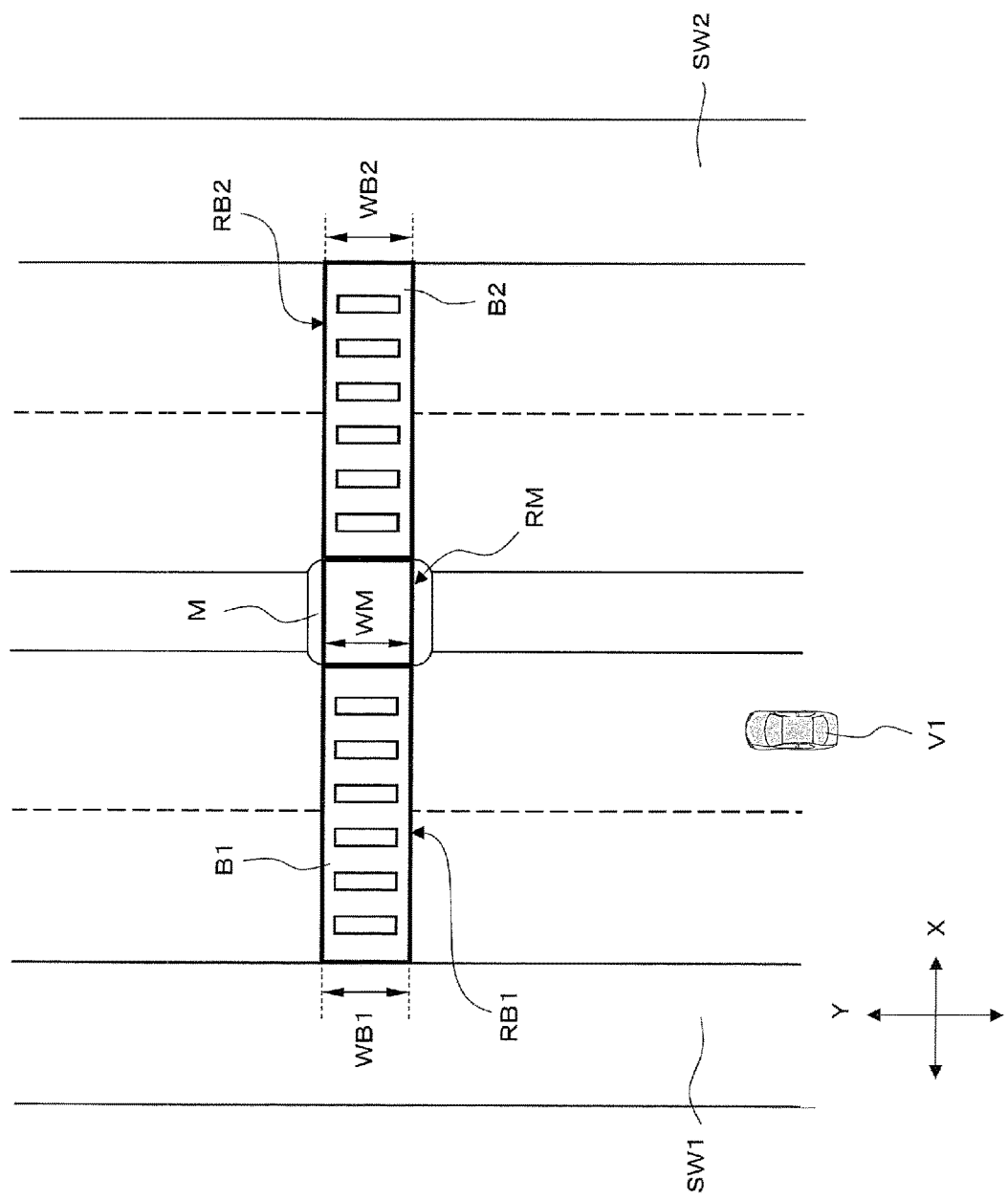
FIG. 5 is a diagram for describing an example of a method of setting a detection area.

The interpolation area setting function of the control device 160 is a function capable of setting an area combining the first pedestrian crosswalk and the second pedestrian crosswalk as an interpolation area. FIG. 5 is a diagram for describing an example of a method of setting a detection area. For example, in the example illustrated in FIG. 5, an area RM combining the first pedestrian crosswalk B1 and the second pedestrian crosswalk B2 is set as the interpolation area. In addition, the control device 160 can use the interpolation area setting function to set the width of the interpolation area on the basis of the width of the first pedestrian crosswalk and the width of the second pedestrian crosswalk. For example, in the example illustrated in FIG. 5, the control device 160 can use the interpolation area setting function to set an average value of the width WB1 of the first pedestrian crosswalk B1 and the width WB2 of the second pedestrian crosswalk B2 as the width WM of the interpolation area RM. In an alternative embodiment, the control device 160 may use the interpolation area setting function to set the width WB1 of the first pedestrian crosswalk B1 as the width WM of the interpolation area R or set the width WB2 of the second pedestrian crosswalk B2 as the width WM of the interpolation area R. In an alternative embodiment, the control device 160 can use the interpolation area setting function to set the width WM of the interpolation area RM so that the width WM of the interpolation area RM changes from the width WB1 of the first pedestrian crosswalk B1 to the width WB2 of the second pedestrian crosswalk B2 toward the second pedestrian crosswalk B2 side from the first pedestrian crosswalk B1 side.

Figure 6:
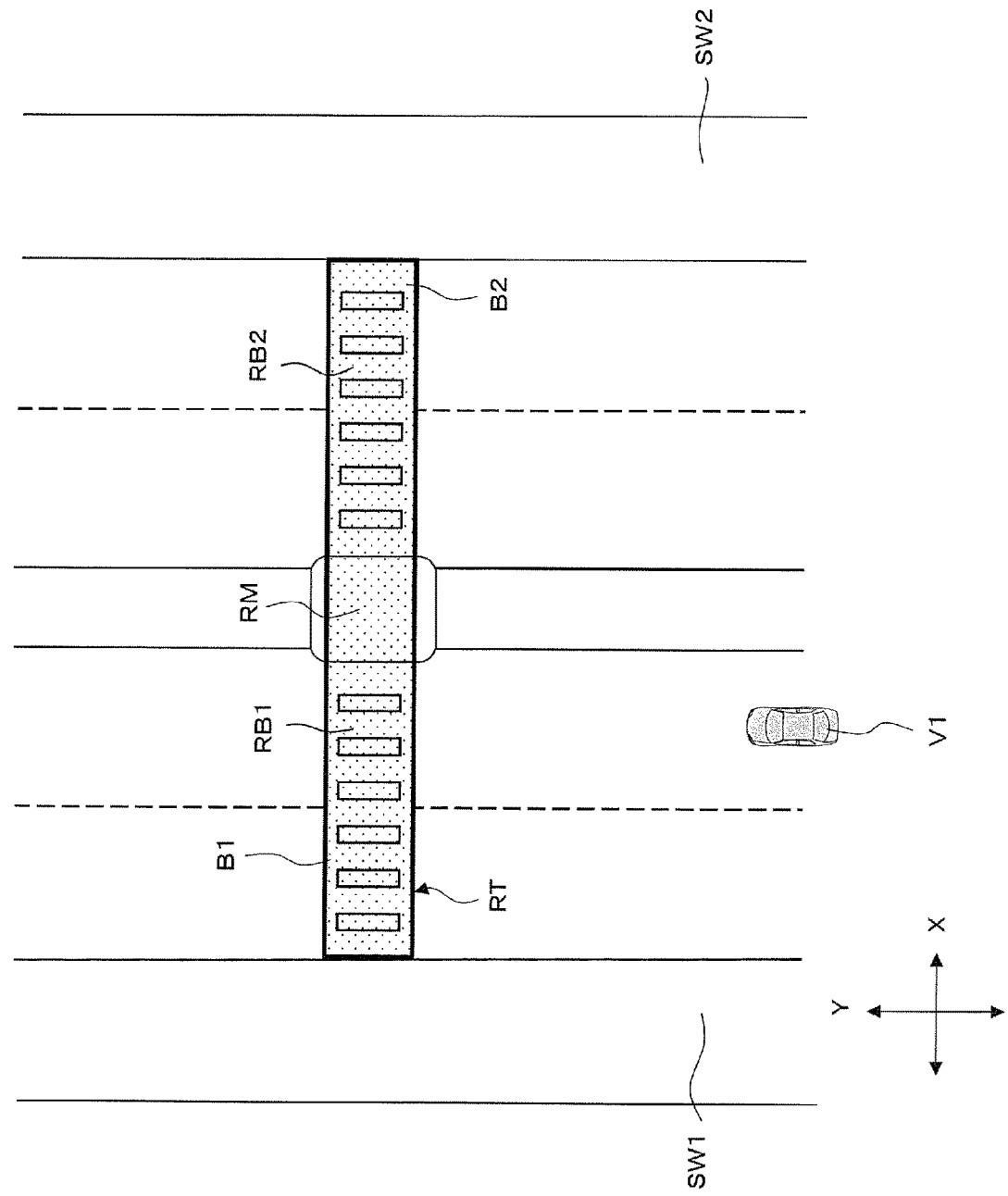
FIG. 6 is a diagram illustrating an example of the detection area.

The detection area setting function of the control device 160 is a function capable of setting an area comprising the first pedestrian crosswalk, the second pedestrian crosswalk, and the interpolation area as a detection area for detecting a moving object. For example, in the example illustrated in FIG. 5, the control device 160 can use the detection area setting function to set an area in which the area RB1 of the first pedestrian crosswalk B1, the area RB2 of the second pedestrian crosswalk B2, and the interpolation area RM are combined, as the detection area for a moving object. Through this operation, as illustrated in FIG. 6, an area RT comprising the area RB1 of the first pedestrian crosswalk B1, the area RB2 of the second pedestrian crosswalk B2, and the interpolation area RM is set as the detection area. When a plurality of second pedestrian crosswalks is specified, the control device 160 can use the detection area setting function to set an area including all the second pedestrian crosswalks as the detection area. When no second pedestrian crosswalk is specified, the control device 160 can use the detection area setting function to set only the area of the first pedestrian crosswalk as the detection area.

The moving object detection function of the control device 160 is a function capable of detecting a moving object in the detection area which is set using the detection area setting function. In the present embodiment, the control device 160 can use the moving object detection function to detect a moving object on the basis only of the detection result in the detection area RT among the detection results detected by the ambient detection sensor 110. Through this operation, as illustrated in FIG. 2, for example, even when a moving object exists on the second pedestrian crosswalk B2 close to the first pedestrian crosswalk B1, such a moving object can be detected.

The travel control function of the control device 160 is a function capable of controlling the automated driving travel of the subject vehicle. Specifically, the control device 160 can use the travel control function to automatically execute the driving operation, which is ordinarily performed by the driver, through operating the drive control device 150 to control the driving mechanisms such as an engine and a brake and the steering mechanism such as a steering actuator on the basis of the detection results of the ambient detection sensor 110 and given travel conditions (such as traffic rules and a planned travel route). For example, the control device 160 can use the travel control function to perform the lane keeping control, which controls the traveling position of the subject vehicle in the width direction, through operating the drive control device 150 to control the operation of the steering actuator or the like so that the subject vehicle travels in a certain lane. In addition or alternatively, the control device 160 can use the travel control function to perform the follow-up travel control, which is for automatically following a preceding vehicle, through operating the drive control device 150 to control the operation of the driving mechanisms such as an engine and a brake so that the subject vehicle travels with a certain distance from the preceding vehicle. In addition or alternatively, the control device 160 can use the travel control function to automatically execute the right or left turn at an intersection, lane change, parking, stopping, and other necessary actions through controlling the driving mechanisms such as an engine and a brake and the steering mechanism such as a steering actuator on the basis of the detection results of the ambient detection sensor 110 and the given travel conditions. For example, in the present embodiment, when a moving object is detected in the detection area using the moving object detection function, the control device 160 can use the travel control function to control the driving mechanisms such as an engine and a brake thereby to stop the subject vehicle before the first pedestrian crosswalk.

Figure 7:
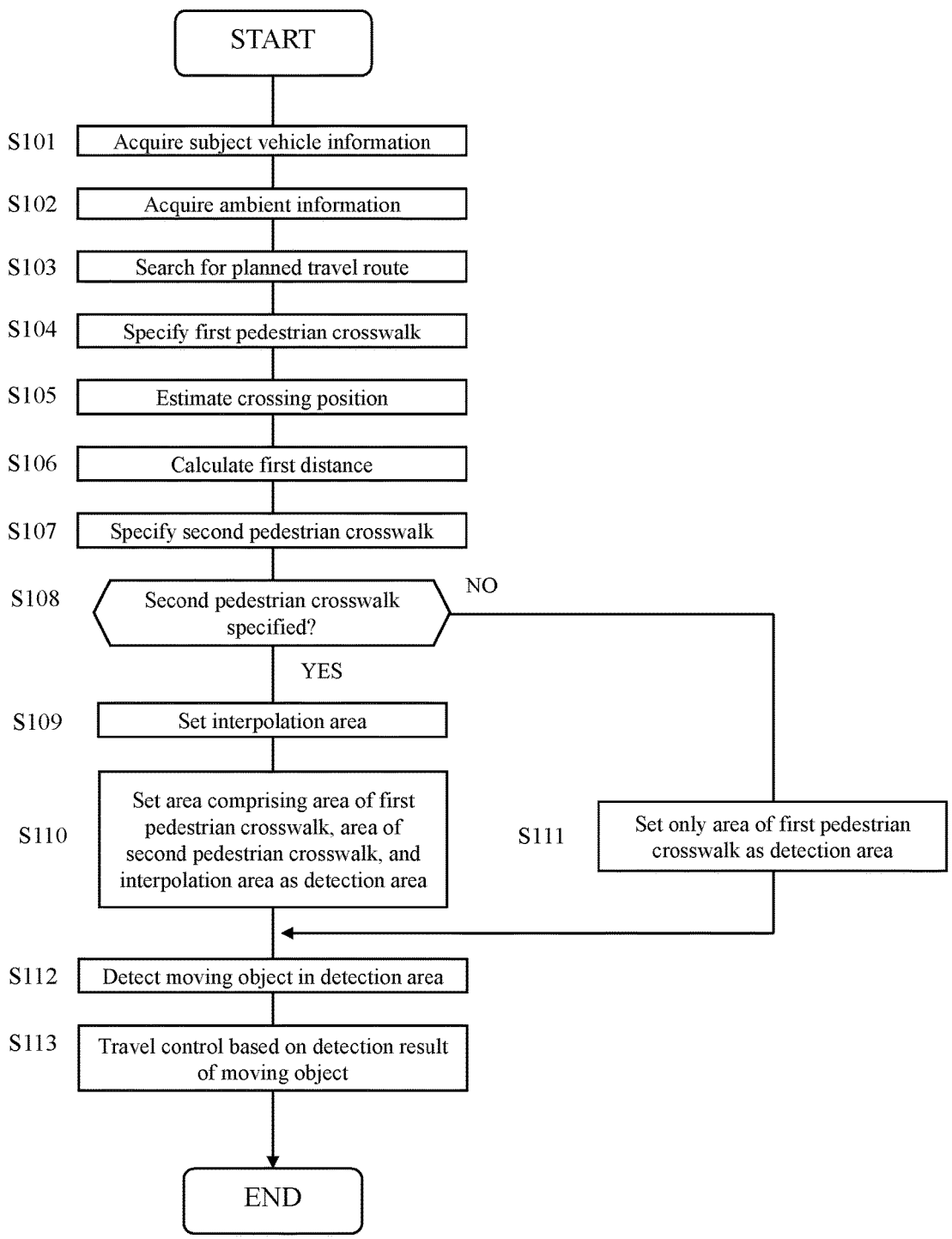
FIG. 7 is a flowchart illustrating an example of the travel control process according to a first embodiment of the present invention.

A travel control process according to the first embodiment will now be described with reference to FIG. 7. FIG. 7 is a flowchart illustrating an example of the travel control process according to the first embodiment. The travel control process described below is executed by the control device 160. The travel control process described below is executed repeatedly at regular time intervals.

First, in step S101, the subject vehicle information acquisition function serves to acquire the subject vehicle information which includes the vehicle speed information and position information. In step S102, the ambient information acquisition function serves to acquire the detection results of the ambient detection sensor 110 as the ambient information.

In step S103, the route search function serves to search for a planned travel route of the subject vehicle. For example, when the driver inputs a destination to an input device (not illustrated), the route search function can serve to search for a route at a lane level in which the subject vehicle travels as the planned travel route on the basis of the map information stored in the database 140.

In step S104, the first pedestrian crosswalk specifying function serves to specify the first pedestrian crosswalk. For example, when the planned travel route searched in step S103 intersects with the area of a pedestrian crosswalk included in the map information stored in the database 140, the control device 160 can use the first pedestrian crosswalk specifying function to specify the pedestrian crosswalk as the first pedestrian crosswalk.

In step S105, the crossing position estimation function serves to estimate a position on the first pedestrian crosswalk through which the subject vehicle passes as the crossing position in the length direction of the first pedestrian crosswalk. For example, the control device 160 can use the crossing position estimation function to estimate a position at which the link of the first pedestrian crosswalk included in the road information stored in the database 140 and the planned travel route of the subject vehicle intersect with each other, as the crossing position.

In step S106, the first distance calculation function serves to calculate the first distance. For example, the control device 160 uses the first distance calculation function to calculate the estimated time for arrival for the subject vehicle to reach the crossing position, on the basis of the vehicle information and positional information of the subject vehicle acquired in step S101. In addition, the control device 160 uses the first distance calculation function to acquire the information on the moving speed of a moving object (e.g. the average moving speed of pedestrians) from the ROM of the control device 160. Then, the control device 160 can use the first distance calculation function to multiply the calculated estimated time for arrival for the subject vehicle by the moving speed of the moving object thereby to calculate the first distance.

In step S107, the second pedestrian crosswalk specifying function serves to specify a pedestrian crosswalk close to the first pedestrian crosswalk as the second pedestrian crosswalk on the basis of the crossing position estimated in step S105 and the first distance calculated in step S106. For example, the control device 160 can use the second pedestrian crosswalk specifying function to specify a pedestrian crosswalk located within the first distance from the crossing position in the length direction of the first pedestrian crosswalk and located close to the first pedestrian crosswalk, as the second pedestrian crosswalk.

In step S108, the second pedestrian crosswalk specifying function serves to determine whether or not a second pedestrian crosswalk is specified in step S107. When a second pedestrian crosswalk is specified, the routine proceeds to step S109, while when a second pedestrian crosswalk is not specified, the routine proceeds to step S111. In step S111, the detection area setting function serves to set only the area of first pedestrian crosswalk as the detection area.

When a second pedestrian crosswalk is specified in step S108, the routine proceeds to step S109. In step S109, the interpolation area setting function serves to set an area combining the first pedestrian crosswalk specified in step S104 and the second pedestrian crosswalk specified in step S107, as the interpolation area. In addition, as illustrated in FIG. 5, the control device 160 uses the interpolation area setting function to set the width WM of the interpolation area RM on the basis of the information on the length WB1 of the first pedestrian crosswalk B1 in the width direction and the length WB2 of the second pedestrian crosswalk B2 in the width direction which are included in the map information of the database 140.

In step S110, the detection area setting function serves to set an area comprising the first pedestrian crosswalk specified in step S104, the second pedestrian crosswalk specified in step S107, and the interpolation area set in step S109, as the detection area for detecting a moving object.

In step S112, the moving object detection function serves to detect a moving object in the detection area which is set in step S110 or step S111. Then, in step S113, the travel control function serves to perform the travel control of the subject vehicle on the basis of the detection result of the moving object in step S112. For example, in the present embodiment, when a moving object is detected in the detection area, control is performed to stop the subject vehicle before the first pedestrian crosswalk.

As described above, in the first embodiment, a pedestrian crosswalk through which the subject vehicle is expected to pass is specified as the first pedestrian crosswalk, and a position on the first pedestrian crosswalk through which the subject vehicle passes is estimated as the crossing position in the length direction of the first pedestrian crosswalk. In addition, among pedestrian crosswalks close to the first pedestrian crosswalk, a pedestrian crosswalk located within the first distance from the crossing position is specified as the second pedestrian crosswalk. Then, an area including the first pedestrian crosswalk and the second pedestrian crosswalk is set as the detection area for a moving object, and the moving object is detected in the detection area. Through this operation in the first embodiment, the moving object can be detected not only in the first pedestrian crosswalk through which the subject vehicle is expected to pass, but also in the second pedestrian crosswalk close to the first pedestrian crosswalk. As a result, the moving object which may come close to the subject vehicle when the subject vehicle approaches the first pedestrian crosswalk can be detected before the subject vehicle reaches the first pedestrian crosswalk. For example, when the subject vehicle performs automated driving, the travel plan of the subject vehicle can be created at earlier timing and it is therefore possible to perform the automated driving with a more margin.

In the first embodiment, the first distance is calculated on the basis of the moving speed of a moving object. Specifically, a distance obtained by multiplying the time required for the subject vehicle to reach the crossing position by the moving speed of the moving object as the first distance. Then, among pedestrian crosswalks close to the first pedestrian crosswalk, a pedestrian crosswalk located within the first distance from the crossing position is specified as the second pedestrian crosswalk. Thus, the vehicle speed of the subject vehicle and the moving speed of the moving object can be taken into account to set the detection area thereby to allow for appropriate detection of the moving object which comes close to the subject vehicle when the subject vehicle reaches the first pedestrian crosswalk.

In the first embodiment, the point of intersection between the planned travel route of the subject vehicle and the moving route of a moving in the first pedestrian crosswalk is estimated as the crossing position, and a position at which the subject vehicle comes close to the moving object in the first pedestrian crosswalk can thus be appropriately estimated. Through this operation, the detection area can be set on the basis of the estimated crossing position thereby to allow for appropriate detection of the moving object which may come close to the subject vehicle when the subject vehicle reaches the first pedestrian crosswalk.

In the first embodiment, among pedestrian crosswalks close to the first pedestrian crosswalk, a pedestrian crosswalk on the moving route of a moving object is specified as the second pedestrian crosswalk and it is thereby possible to set an area in which the moving object is highly possible to move as the detection area and improve the accuracy in detecting the moving object.

In the first embodiment, when the second pedestrian crosswalk is specified, an area combining the first pedestrian crosswalk and the second pedestrian crosswalk is set as the interpolation area. This allows for appropriate detection of a moving object that currently waits or moves on a median strip between the first pedestrian crosswalk and the second pedestrian crosswalk and may come close to the subject vehicle when the subject vehicle approaches the first pedestrian crosswalk.

In the first embodiment, as illustrated in FIG. 5, the width WM of the interpolation area RM is set in accordance with the width WB1 of the first pedestrian crosswalk B1 and the width WB2 of the second pedestrian crosswalk B2. Through this operation, an area of the median strip M in which the moving object is highly possible to move can be set as the interpolation area. As a result, the accuracy in detecting a moving object can be improved as compared with a case in which the entire area of the median strip M is set as the detection area.

Second Embodiment

A travel control apparatus for a vehicle according to a second embodiment of the present invention will then be described. The travel control apparatus 100 for a vehicle according to the second embodiment has the same configuration as that in the first embodiment and operates in the same manner as in the first embodiment except that it operates as follows.

The control device 160 according to the second embodiment has a second distance calculation function of calculating a second distance different from the first distance and a target area determination function of determining an area of the second pedestrian crosswalk to be set as the detection area in addition to the functions of the first embodiment.

The second distance calculation function of the control device 160 will first be described. For example, the second distance calculation function is a function capable of calculating a second distance D2 (D2=T×V2) through multiplying the time for arrival T, which is required for the subject vehicle to reach the first pedestrian crosswalk, by the moving speed V2 of a moving object in the same manner as for the first distance calculated using the first distance calculation function.

When an obstacle exists on the second pedestrian crosswalk and a moving object cannot cross the second pedestrian crosswalk, such as when another vehicle makes a stop on the second pedestrian crosswalk, the control device 160 can use the second distance calculation function to calculate a distance from the crossing position to the obstacle on the second pedestrian crosswalk as the second distance. In addition, the control device 160 can use the second distance calculation function to estimate the planned travel route of a surrounding vehicle traveling around the subject vehicle and determine whether or not the planned travel route of the surrounding vehicle intersects with the second pedestrian crosswalk. Then, when a determination is made that the planned travel route of the surrounding vehicle intersects with the second pedestrian crosswalk, the control device 160 can use the second distance calculation function to determine that the moving object cannot cross the second pedestrian crosswalk due to the surrounding vehicle traveling and calculate a distance from the crossing position P at which the subject vehicle gets across the first pedestrian crosswalk to the position at which the surrounding vehicle gets across the second pedestrian crosswalk, as the second distance.

The target area determination function of the control device 160 will then be described. The target area determination function is a function capable of determining a partial area of the second pedestrian crosswalk as a target area. The partial area of the second pedestrian crosswalk is set to be included in the detection area. Specifically, the control device 160 uses the target area determination function to refer to the map information stored in the database 140 to determine a specific area of the area corresponding to the second pedestrian crosswalk as the partial area (target area) of the second pedestrian crosswalk which is set to be included in the detection area. The specific area is an area located within the second distance from the crossing position P in the length direction of the first pedestrian crosswalk.

The detection area setting function according to the second embodiment is a function capable of setting an area comprising the area of the first pedestrian crosswalk, the interpolation area, and the target area of the second pedestrian crosswalk determined using the target area determination function, as the detection area. A method of setting the detection area according to the second embodiment will be described below.

Figure 8:
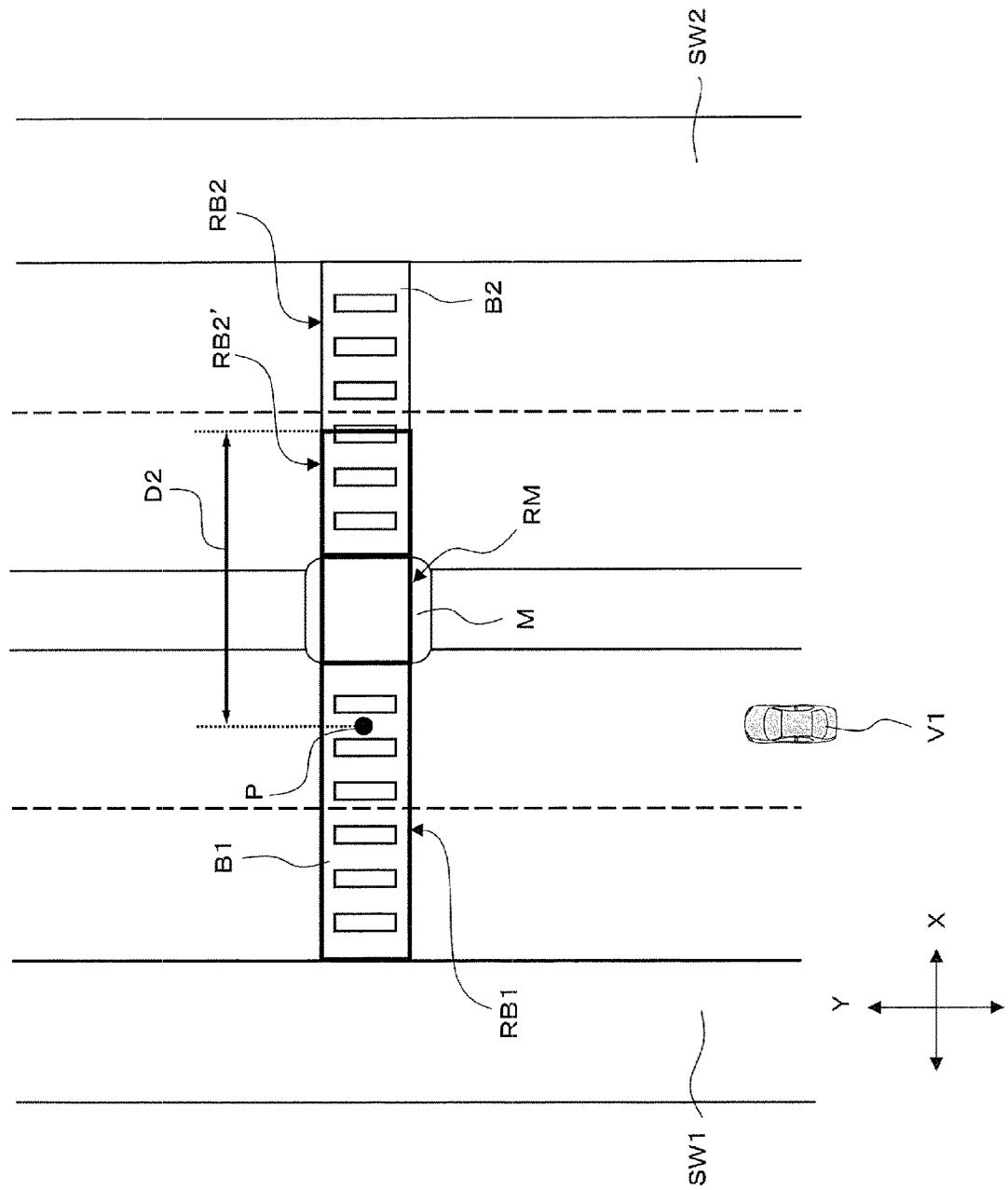
FIG. 8 is a diagram illustrating an example of a method of setting the detection area in a second embodiment of the present invention.
Figure 9:
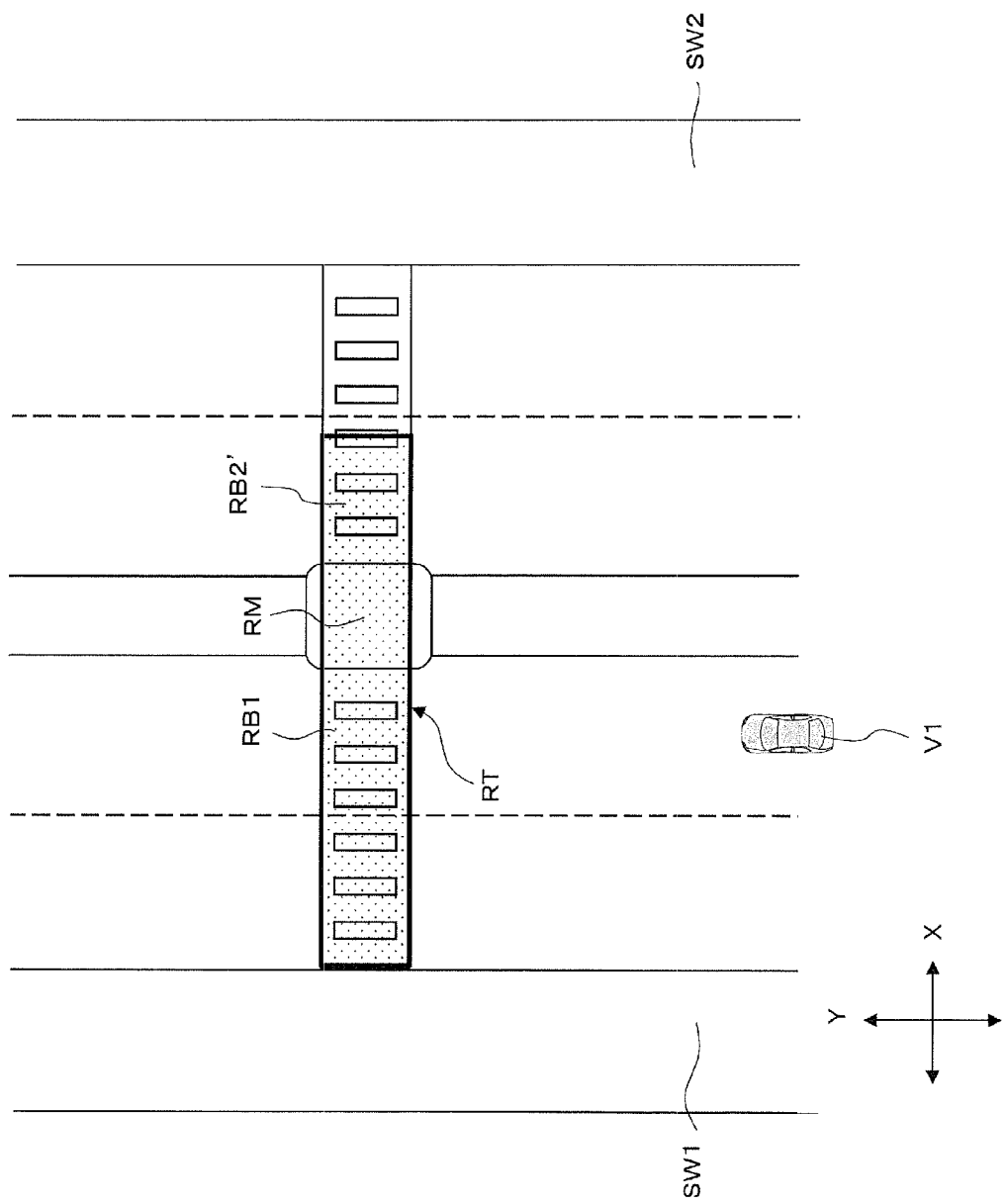
FIG. 9 is a diagram illustrating an example of the detection area in the second embodiment of the present invention.

FIG. 8 is a diagram illustrating an example of the method of setting the detection area in the second embodiment. For example, in the example illustrated in FIG. 8, the pedestrian crosswalk B1 is specified as the first pedestrian crosswalk and the pedestrian crosswalk B2 is specified as the second pedestrian crosswalk. In addition, the area RM combining the first pedestrian crosswalk B1 and the second pedestrian crosswalk B2 is set as the interpolation area. In this case, the control device 160 uses the second distance calculation function to calculate the second distance D2 on the basis of the moving speed of a moving object and the estimated time for arrival for the subject vehicle V1 to reach the crossing position P. Then, the control device 160 uses the target area determination function to determine a specific area RB2' of the area RB2 of the second pedestrian crosswalk as the target area of the second pedestrian crosswalk which is set to be included in the detection area. The specific area RB2' is an area to which the distance from the crossing position P is the second distance D2 or less in the length direction (X-direction) of the first pedestrian crosswalk B1. Through this operation, as illustrated in FIG. 9, an area RT comprising the area RB1 of the first pedestrian crosswalk B1, the target area RB2' of the second pedestrian crosswalk B2, and the interpolation area RM is set as the detection area for a moving object.

Figure 10:
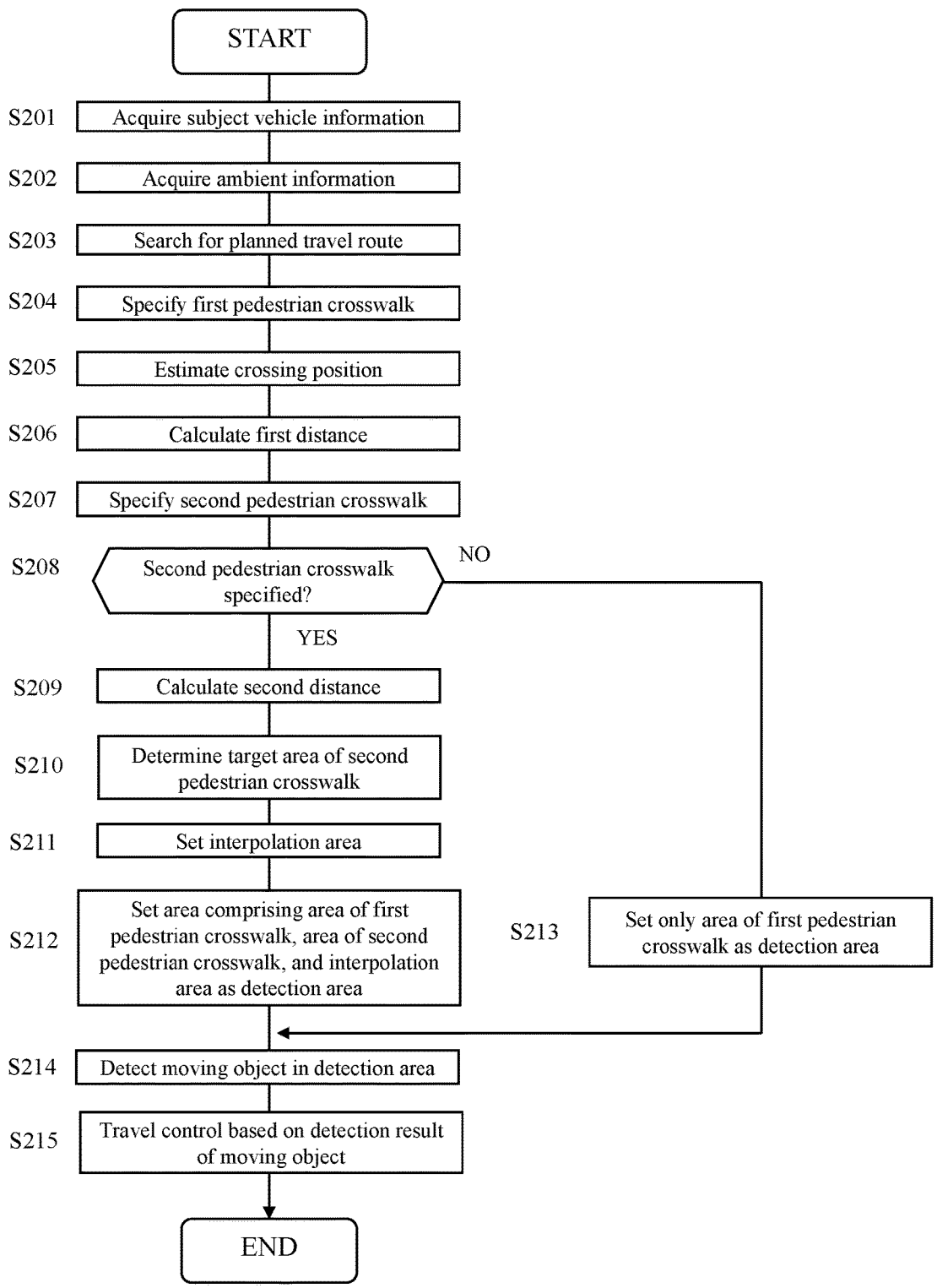
FIG. 10 is a flowchart illustrating an example of the travel control process according to the second embodiment of the present invention.

A travel control process according to the second embodiment will then be described with reference to FIG. 10. FIG. 10 is a flowchart illustrating an example of the travel control process according to the second embodiment. The travel control process described below is executed by the control device 160.

In steps S201 to S207, the same processes as in steps S101 to S107 of the first embodiment are performed. That is, the subject vehicle information including the vehicle speed information and positional information is acquired (step S201), the detection results of the ambient detection sensor 110 are acquired as the ambient information (step S202), the planned travel route of the subject vehicle is searched (step S203), the first pedestrian crosswalk is specified (step S204), the position on the first pedestrian crosswalk at which the subject vehicle passes through the first pedestrian crosswalk is estimated as the crossing position (step S205), the first distance is calculated (step S206), and the second pedestrian crosswalk is specified on the basis of the crossing position and the first distance (step S207).

In step S208, a determination is made whether or not a second pedestrian crosswalk is specified in step S207, as in step S108 of the first embodiment. When a second pedestrian crosswalk is specified, the routine proceeds to step S209, while when a second pedestrian crosswalk is not specified, the routine proceeds to step S213. In step S213, only the area of the first pedestrian crosswalk is set as the detection area, as in step S111 of the first embodiment.

When a second pedestrian crosswalk is specified in step S208, the routine proceeds to step S209. In step S109, the second distance calculation function serves to calculate the second distance. For example, the control device 160 can use the second distance calculation function to calculate the second distance D2 through multiplying the estimated time for arrival T for the subject vehicle by the moving speed Vp of the moving object. In addition or alternatively, when an obstacle exists on the second pedestrian crosswalk or when a moving object cannot cross the second pedestrian crosswalk due to a surrounding vehicle traveling, the control device 160 can use the second distance calculation function to calculate a distance from the crossing position P to the obstacle or a distance from the crossing position P to the position at which the surrounding vehicle passes through the second pedestrian crosswalk, as the second distance D2.

In step S210, the target area determination function serves to determine the target area of the second pedestrian crosswalk. For example, the control device 160 can use the target area determination function to determine a specific area of the area of the second pedestrian crosswalk as the target area. The specific area is located within the second distance from the crossing position in the length direction of the first pedestrian crosswalk.

In step S211, the interpolation area is set as in step S109 of the first embodiment. Then, in step S212, the detection area setting function serves to set the detection area. In the second embodiment, as illustrated in FIG. 9, the control device 160 uses the detection area setting function to set the area RT comprising the area RB1 of the first pedestrian crosswalk B1 specified in step S204, the target area RB2' of the second pedestrian crosswalk B2 determined in step S210, and the interpolation area RM set in step S211, as the detection area.

In steps S214 and S215, as in steps S112 and S113 of the first embodiment, a moving object is detected (step S214) in the detection area set in step S212 or step S213, and the travel plan of the subject vehicle is determined (step S215) on the basis of the detection result of a moving object in step S214.

As described above, in the second embodiment, the distance in which a moving object can move to the crossing position until the subject vehicle reaches the first pedestrian crosswalk is calculated as the second distance, and the specific area of the area of the second pedestrian crosswalk located within the second distance from the crossing position P is determined as the partial area of the second pedestrian crosswalk which is set to be included in the detection area, that is, the target area. Then, as illustrated in FIG. 9, the area RT comprising the area RB1 of the first pedestrian crosswalk, the target area RB2' of the second pedestrian crosswalk, and the interpolation area RM is set as the detection area for a moving object. Through this operation, an area of the second pedestrian crosswalk in which a moving object that may come close to the subject vehicle at the first pedestrian crosswalk is highly possible to currently exist can be set as the detection area. As a result, the accuracy in detecting a moving object can be improved as compared with a case in which the entire area of the second pedestrian crosswalk is set as the detection area.

In the second embodiment, the moving speed of a moving object is taken into account to calculate the second distance, and an area in which a moving object that may come close to the subject vehicle at the first pedestrian crosswalk is highly possible to currently exist can thereby be more appropriately set as the detection area.

In the second embodiment, when an obstacle exists on the second pedestrian crosswalk or when a moving object cannot cross the second pedestrian crosswalk due to a surrounding vehicle traveling, a distance from the crossing position P to the obstacle or a distance from the crossing position P to the position at which the surrounding vehicle passes through the second pedestrian crosswalk is calculated as the second distance. Through this operation, a range in which the moving object is able to actually move can be more appropriately set as the detection area and it is therefore possible to improve the accuracy in detecting a moving object.

Third Embodiment

A travel control apparatus for a vehicle according to a third embodiment of the present invention will then be described. The travel control apparatus 100 for a vehicle according to the third embodiment has the same configuration as that in the first embodiment and operates in the same manner as in the first embodiment except that it operates as follows.

The control device 160 according to the third embodiment has a crossing possibility determination function of determining whether or not a moving object can cross the second pedestrian crosswalk in addition to the functions of the first embodiment. For example, the crossing possibility determination function includes a function capable of acquiring the captured image of a traffic signal for pedestrians at the second pedestrian crosswalk from a camera attached to the subject vehicle. Then, the control device 160 can use the crossing possibility determination function to determine the signal indication (lighting of red or green or blinking of green) of the traffic signal for pedestrians at the second pedestrian crosswalk on the basis of the acquired captured image. In addition, the control device 160 can use the crossing possibility determination function to determine whether or not a moving object can cross the second pedestrian crosswalk, on the basis of the determined signal indication of the traffic signal for pedestrians at the second pedestrian crosswalk.

In addition or alternatively, the control device 160 can use the crossing possibility determination function to estimate the signal indication of the traffic signal for pedestrians at the second pedestrian crosswalk on the basis of the signal indication (such as red, yellow, or green) of a traffic signal for vehicles that is located before the second pedestrian crosswalk. For example, the control device 160 can use the crossing possibility determination function to acquire the correspondence relationship between the signal indication of the traffic signal for vehicles located before the second pedestrian crosswalk and the signal indication of the traffic signal for pedestrians at the second pedestrian crosswalk from the ROM of the control device 160 or from an external server and refer to the correspondence relationship to estimate the signal indication of the traffic signal for pedestrians at the second pedestrian crosswalk from the signal indication of the traffic signal for vehicles located before the second pedestrian crosswalk. For example, provided that there is a correspondence relationship in which the traffic signal for pedestrians at the second pedestrian crosswalk indicates a signal representing that moving objects cannot cross the second pedestrian crosswalk when the traffic signal for vehicles located before the second pedestrian crosswalk indicates a signal representing that vehicles can travel, the control device 160 can use the crossing possibility determination function to estimate the signal indication of the traffic signal for pedestrians from the signal indication of the traffic signal for vehicles. In an alternative configuration, the control device 160 can use the crossing possibility determination function to receive probe information including information on the signal indication of the traffic signal for pedestrians at the second pedestrian crosswalk from another vehicle or from an external server thereby to determine the signal indication of the traffic signal for pedestrians at the second pedestrian crosswalk.

In addition or alternatively, the control device 160 can use the crossing possibility determination function to determine that a moving object cannot cross the second pedestrian crosswalk when an obstacle exists on the second pedestrian crosswalk or when a moving object cannot cross the second pedestrian crosswalk due to a surrounding vehicle passing through the second pedestrian crosswalk.

In the third embodiment, the second pedestrian crosswalk specifying function is a function capable of estimating the moving route of a moving object crossing the first pedestrian crosswalk. For example, the control device 160 uses the second pedestrian crosswalk specifying function to detect road configurations (such as sidewalks, roadside strips, median strips, and pedestrian crosswalks) around the first pedestrian crosswalk and estimate the moving route of a moving object moving toward the first pedestrian crosswalk. For example, in the example illustrated in FIG. 11, the second pedestrian crosswalk specifying function can serve to estimate moving routes S1 to S4 of a moving object moving from the first pedestrian crosswalk on the basis of the road configurations around the first pedestrian crosswalk. Then, the control device 160 can use the second pedestrian crosswalk specifying function to estimate a pedestrian crosswalk to which the distance from the crossing position P along a moving route of the moving object is the first distance or less, as the second pedestrian crosswalk. For example, in the example illustrated in FIG. 11, it is assumed that the lengths of arrows indicating the moving routes S1 to S4 each represent the first distance. In this case, the control device 160 can use the second pedestrian crosswalk specifying function to estimate each of the pedestrian crosswalks B2 and B3 to which the distances from the crossing position P along the moving routes S1 and S2 of a moving object are the first distance or less, as the second pedestrian crosswalk.

In the third embodiment, the detection area setting function is a function capable of setting the detection area on the basis of the determination result by the crossing possibility determination function. Specifically, when the crossing possibility determination function serves to determine that crossing of a second pedestrian crosswalk is possible, the control device 160 uses the detection area setting function to set an area comprising the area of the first pedestrian crosswalk, the area of the second pedestrian crosswalk which a moving object can cross, and the interpolation area as the detection area. On the other hand, when the crossing possibility determination function serves to determine that crossing of the second pedestrian crosswalk is not possible, the control device 160 uses the detection area setting function to set only the area of the first pedestrian crosswalk as the detection area.

Figure 12:
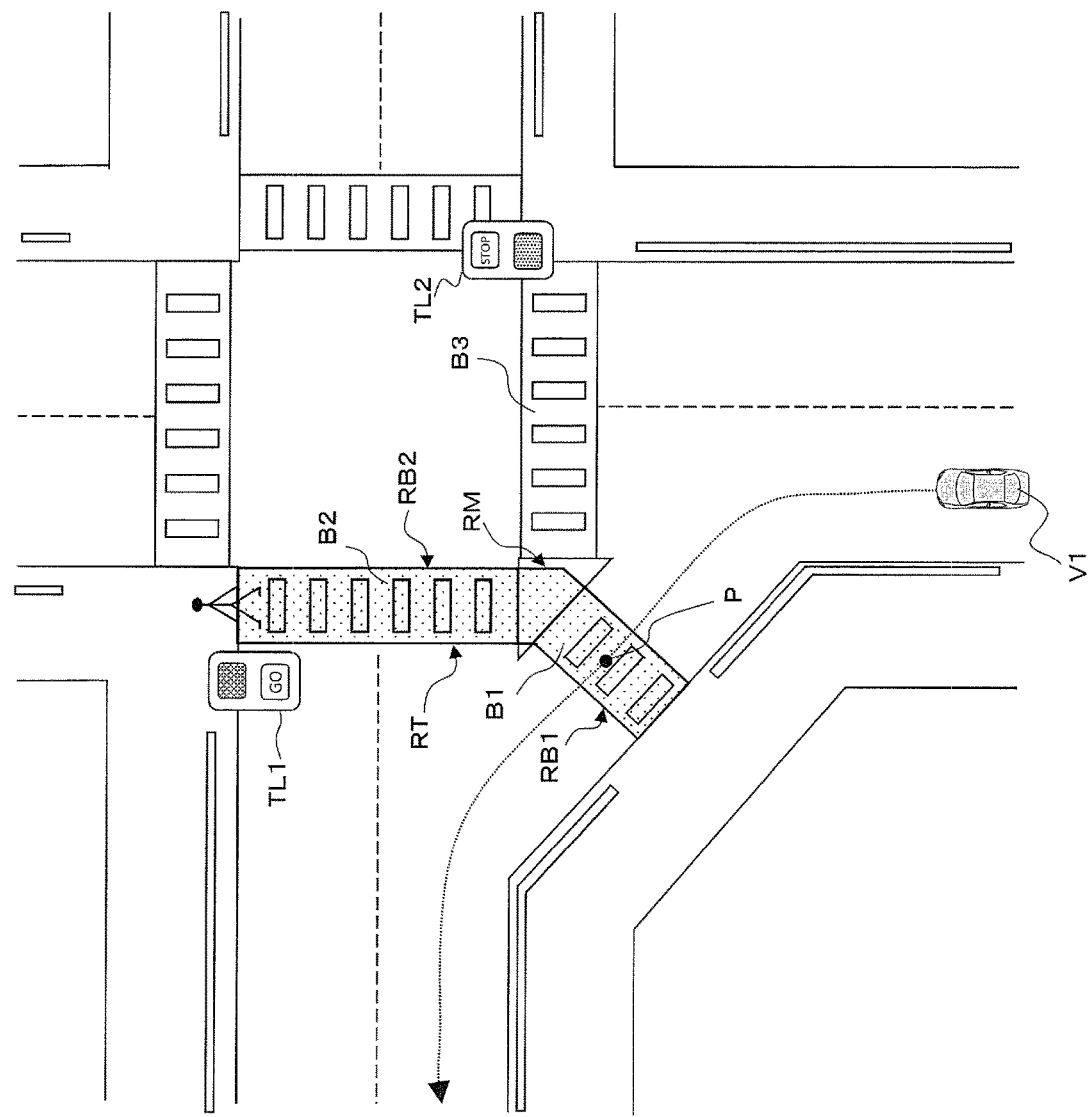
FIG. 12 is a diagram (part 1) for describing an example of a method of setting the detection area in a third embodiment of the present invention.

FIG. 12 is a diagram for describing an example of a method of setting the detection area in the third embodiment. For example, in the example illustrated in FIG. 12, the pedestrian crosswalk B1 is specified as the first pedestrian crosswalk through which the subject vehicle V1 is expected to pass, and the pedestrian crosswalks B2 and B3 are specified as the second pedestrian crosswalks located within the first distance from the crossing position P. Further, in the example illustrated in FIG. 12, the traffic signal for pedestrians TL1 at the second pedestrian crosswalk B2 indicates a signal representing that a moving object can cross the second pedestrian crosswalk B2 while the traffic signal for pedestrians TL2 at the second pedestrian crosswalk B3 indicates a signal representing that a moving object cannot cross the second pedestrian crosswalk B3. In this case, the control device 160 can use the crossing possibility determination function to determine that crossing of the second pedestrian crosswalk B2 is possible and crossing of the second pedestrian crosswalk B3 is not possible. Accordingly, the control device 160 can use the detection area setting function to set an area RT comprising the area RB1 of the first pedestrian crosswalk B1, the area RB2 of the second pedestrian crosswalk B2 along which crossing is possible, and the interpolation area RM as the detection area for a moving object.

Figure 13:
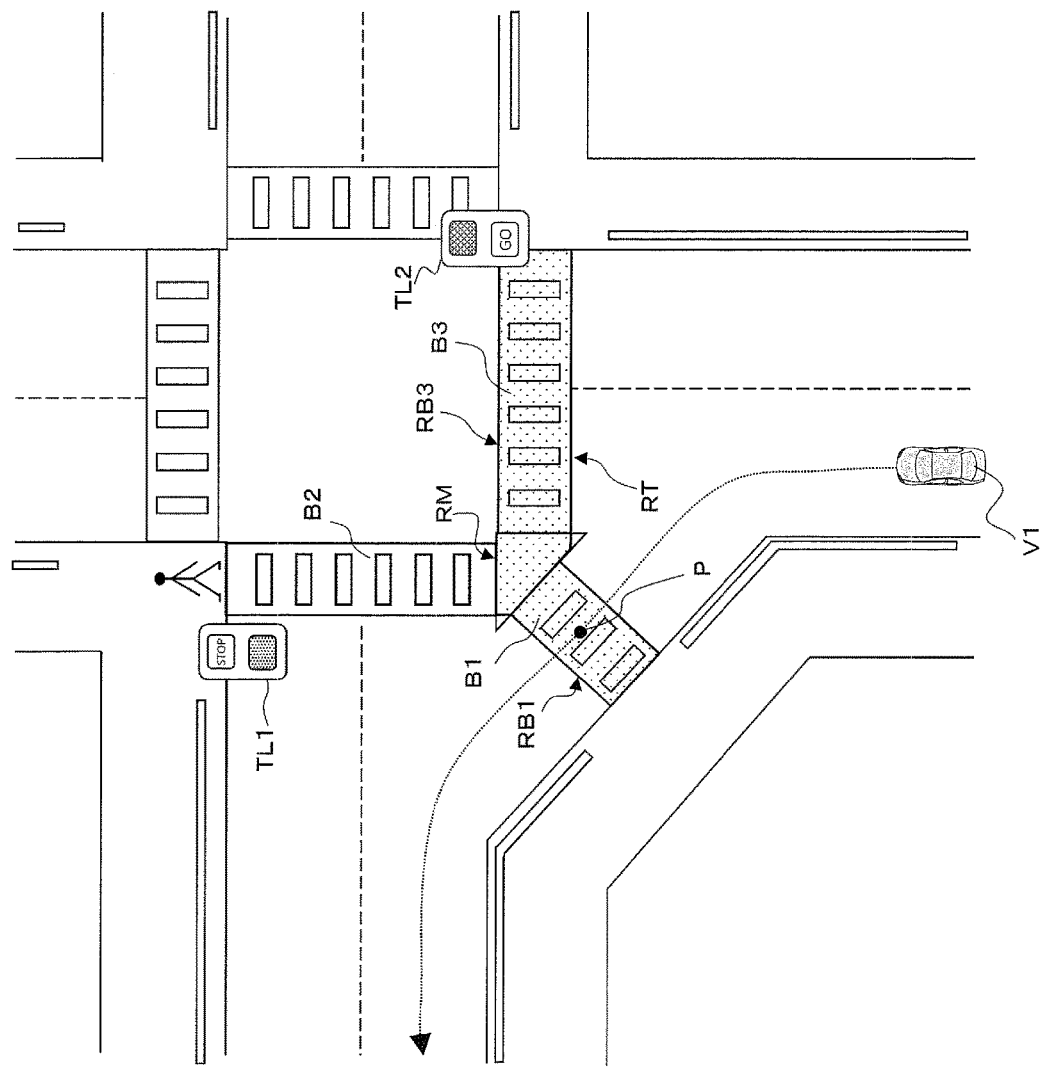
FIG. 13 is a diagram (part 2) for describing an example of the method of setting the detection area in the third embodiment of the present invention.

FIG. 13 is a diagram illustrating a different scene than the scene of FIG. 12 for describing an example of a method of setting the detection area in the third embodiment. In the example illustrated in FIG. 13, the traffic signal for pedestrians TL1 at the second pedestrian crosswalk B2 indicates a signal representing that a moving object cannot cross the second pedestrian crosswalk B2 while the traffic signal for pedestrians TL2 at the second pedestrian crosswalk B3 indicates a signal representing that a moving object can cross the second pedestrian crosswalk B3. In this case, the control device 160 can use the crossing possibility determination function to determine that crossing of the second pedestrian crosswalk B2 is not possible and crossing of the second pedestrian crosswalk B3 is possible. Accordingly, the control device 160 can use the detection area setting function to set an area RT comprising the area RB1 of the first pedestrian crosswalk B1, the area RB3 of the second pedestrian crosswalk B3 along which crossing is possible, and the interpolation area RM as the detection area for a moving object.

Figure 14:
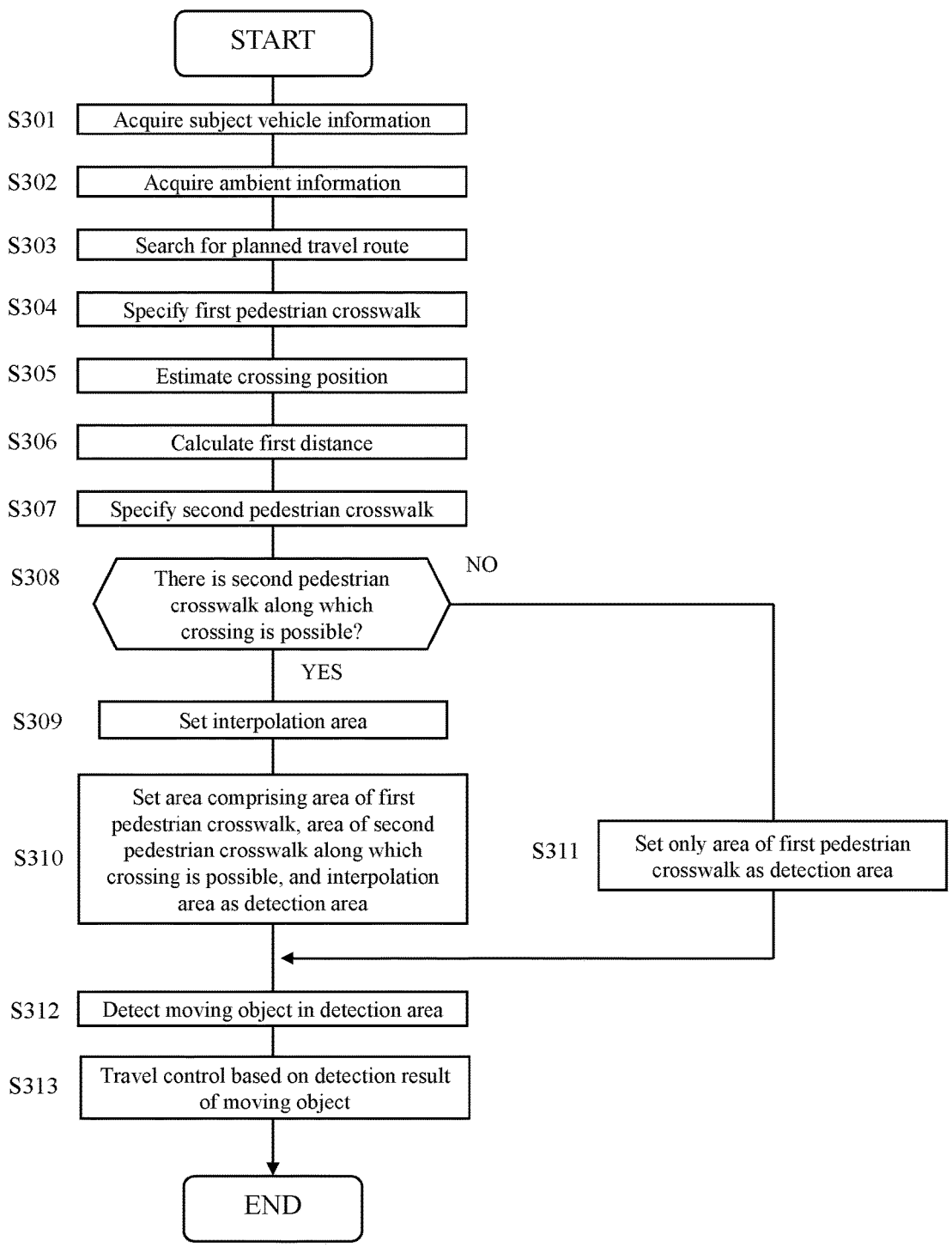
FIG. 14 is a flowchart illustrating an example of the travel control process according to the third embodiment of the present invention.

A travel control process according to the third embodiment will then be described. FIG. 14 is a flowchart illustrating an example of the travel control process according to the third embodiment. The travel control process described below is executed by the control device 160.

Figure 11:
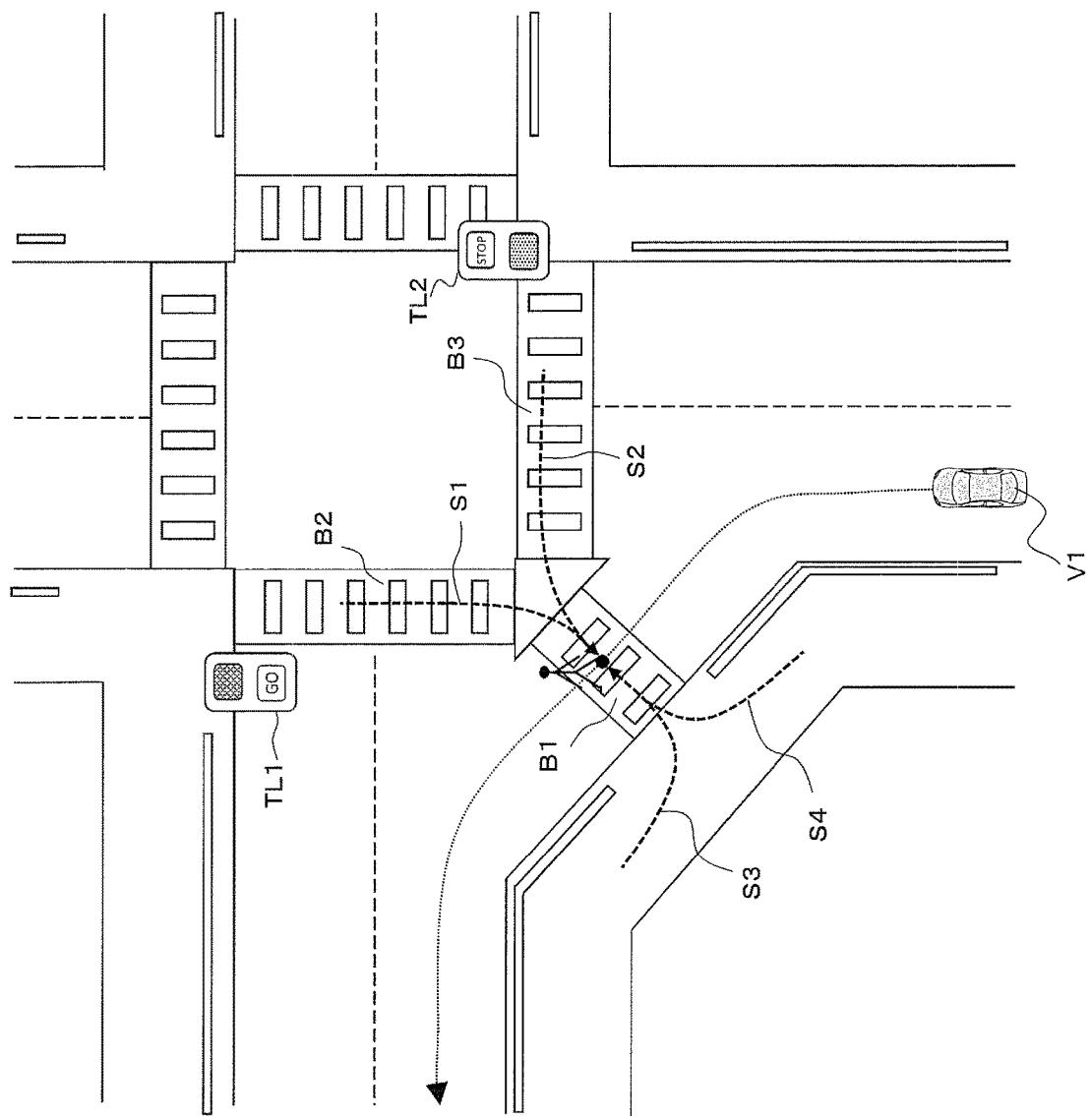
FIG. 11 is a diagram for describing an example of a moving route of a moving object.

In steps S301 to S306, the same processes as in steps S101 to S106 of the first embodiment are performed, so the description will be omitted. In step S307, the second pedestrian crosswalk specifying function serves to estimate a pedestrian crosswalk to which the distance from the crossing position P along the moving route of a moving object is the first distance or less, as the second pedestrian crosswalk. FIG. 11 is a diagram for describing an example of the moving route of a moving object. For example, in the example illustrated in FIG. 11, the control device 160 can use the second pedestrian crosswalk specifying function to estimate each of the pedestrian crosswalks B2 and B3 to which the distances from the crossing position P along the moving routes S1 and S2 of a moving object are the first distance or less, as the second pedestrian crosswalk.

In step S308, the crossing possibility determination function serves to determine whether or not there is a second pedestrian crosswalk which a moving object can cross. For example, the control device 160 can use the crossing possibility determination function to determine the signal indication of the traffic signal for pedestrians at the second pedestrian crosswalk from the image captured by a camera thereby to determine whether or not there is a second pedestrian crosswalk which a moving object can cross. When there is a second pedestrian crosswalk which a moving object can cross, the routine proceeds to step S309, while when there is not a second pedestrian crosswalk which a moving object can cross, the routine proceeds to step S311. In step S311, the detection area setting function serves to set only the area of the first pedestrian crosswalk as the detection area.

When, in step S308, a determination is made that there is a second pedestrian crosswalk which a moving object can cross, the routine proceeds to step S309 in which the interpolation area is set as in step S109 of the first embodiment. Then, in step S310, the detection area setting function serves to set the detection area. In step S310, a determination is made that there is a second pedestrian crosswalk which a moving object can cross, and the control device 160 therefore uses the detection area setting function to set an area comprising the area of the first pedestrian crosswalk, the area of the second pedestrian crosswalk along which crossing is possible, and the interpolation area as the detection area. Through this operation, in the example illustrated in FIG. 12, the area RT comprising the area RB1 of the first pedestrian crosswalk B1, the area RB2 of the second pedestrian crosswalk B2 along which crossing is possible, and the interpolation area RM is set as the detection area. On the other hand, in the example illustrated in FIG. 13, the area RT comprising the area RB1 of the first pedestrian crosswalk B1, the area RB3 of the second pedestrian crosswalk B3 along which crossing is possible, and the interpolation area RM is set as the detection area.

As described above, in the third embodiment, a determination is made whether there is a second pedestrian crosswalk which a moving object can cross. When there is a second pedestrian crosswalk along which crossing is possible, the area comprising the area of the first pedestrian crosswalk, the area of the second pedestrian crosswalk which a moving object can cross, and the interpolation area is set as the detection area. In contrast, when there is a second pedestrian crosswalk along which crossing is not possible, such a second pedestrian crosswalk is not set as the detection area. Through this operation, an additional effect can be obtained in the third embodiment in addition to the effects of the first and second embodiments. That is, a moving object can be detected with reference to the second pedestrian crosswalk which a moving object can cross (i.e. with exception of a second pedestrian crosswalk which a moving object cannot cross) and it is therefore possible to more improve the accuracy in detecting a moving object that may come close to the subject vehicle when the subject vehicle approaches the first pedestrian crosswalk.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, a configuration is exemplified in which the travel control apparatus 100 includes the database 140, but the travel control apparatus 100 can also be configured to receive the map information from a server provided outside the vehicle.

In the above-described embodiments, a configuration is exemplified in which the moving distance for a moving object to move until the subject vehicle reaches the first pedestrian crosswalk is calculated by acquiring the moving speed of the moving object which is preliminarily stored in the ROM of the control device 160, but the present invention is not limited to this configuration and another configuration can also be employed in which an actual moving speed of the moving object is calculated by repeatedly detecting the moving object and the moving distance for the moving object to move until the subject vehicle reaches the first pedestrian crosswalk is calculated on the basis of the calculated actual moving speed of the moving object.

In the above-described first embodiment and second embodiment, a configuration is exemplified in which a pedestrian crosswalk to which the distance from the crossing position in the length direction of the first pedestrian crosswalk is the first distance or less is specified as the second pedestrian crosswalk, but the present invention is not limited to this configuration and another configuration can also be employed in which, as in the third embodiment, the moving route of a moving object is estimated and a pedestrian crosswalk to which the distance from the crossing position along the moving route of the moving object is the first distance or less is specified as the second pedestrian crosswalk.

In the above-described embodiments, a configuration is exemplified in which the position of the point of intersection P between the link LA2 of the lane A2 representing the planned travel route of the subject vehicle V1 and the link LB1 of the first pedestrian crosswalk B1 is estimated as the crossing position, but the present invention is not limited to this configuration. For example, in the example illustrated in FIG. 2, when the area information of each lane is included in the map information stored in the database 140, the map information stored in the database 140 can be referred to, to estimate the position of the center of an area in which the area of the lane A2 for the subject vehicle V1 to travel and the area RB1 of the first pedestrian crosswalk B1 overlap each other, as the crossing position. In addition or alternatively, the position of any of end parts of an area in which the area of the lane A2 for the subject vehicle V1 to travel and the area RB1 of the first pedestrian crosswalk B1 overlap each other can be estimated as the crossing position. In addition or alternatively, in the area of the lane A2 for the subject vehicle V1 to travel, the position of the center of an area in which the area corresponding to the vehicle width of the subject vehicle V1 and the area RB1 of the first pedestrian crosswalk B1 overlap each other may be estimated as the crossing position.

In the above-described embodiments, the ambient detection sensor 110 corresponds to the detector of the present invention and the control device 160 corresponds to the controller of the present invention.

DESCRIPTION OF REFERENCE NUMERALS

100 Travel control apparatus
110 Ambient detection sensor
120 Vehicle speed sensor
130 Subject vehicle position detection device
140 Database
150 Drive control device
160 Control device

The invention claimed is:

1. A travel control method for a vehicle, comprising:
specifying a pedestrian crosswalk through which a subject vehicle is expected to pass as a first pedestrian crosswalk;
estimating a position on the first pedestrian crosswalk through which the subject vehicle passes as a crossing position in a length direction of the first pedestrian crosswalk;
determining whether or not another pedestrian crosswalk located within a predetermined first distance from the crossing position and located close to the first pedestrian crosswalk is specified as a second pedestrian crosswalk;
when the second pedestrian crosswalk is specified, setting an area combining the first pedestrian crosswalk and the second pedestrian crosswalk as an interpolation area;
setting an area including the first pedestrian crosswalk, the second pedestrian crosswalk, and the interpolation area as a detection area of a detector detecting an object around the subject vehicle; and
controlling travel of the subject vehicle on a basis of a detection result of the detector.

2. The travel control method for a vehicle according to claim 1, comprising:
determining a partial area of the second pedestrian crosswalk as a target area; and
setting an area including the target area as the detection area,
the target area being a specific area located within a predetermined second distance from the crossing position, the specific area being included in an area of the second pedestrian crosswalk.

3. The travel control method for a vehicle according to claim 1, comprising:
determining a partial area of the second pedestrian crosswalk as a target area;
setting an area including the target area as the detection area; and
when an obstacle exists on the second pedestrian crosswalk, calculating a distance from the crossing position to a position of the obstacle as a second distance,
the target area being a specific area located within the second distance from the crossing position, the specific area being included in an area of the second pedestrian crosswalk.

4. The travel control method for a vehicle according to claim 1, comprising
estimating a signal indication of a traffic signal for pedestrians at the second pedestrian crosswalk from a signal indication of a traffic signal for vehicles located before the second pedestrian crosswalk on a basis of a correspondence relationship between the signal indication of the traffic signal for pedestrians at the second pedestrian crosswalk and the signal indication of the traffic signal for vehicles located before the second pedestrian crosswalk.

5. A travel control method for a vehicle, comprising:
specifying a pedestrian crosswalk through which a subject vehicle is expected to pass as a first pedestrian crosswalk;
estimating moving routes of a moving object moving toward the first pedestrian crosswalk on a basis of road configurations around the first pedestrian crosswalk;
estimating a position on the first pedestrian crosswalk through which the subject vehicle passes as a crossing position in a length direction of the first pedestrian crosswalk, the crossing position being a point of intersection between a planned travel route of the subject vehicle and a moving route of the moving object in the first pedestrian crosswalk;
specifying as a second pedestrian crosswalk another pedestrian crosswalk located within a predetermined first distance from the crossing position along the moving route of the moving object moving toward the first pedestrian crosswalk and located close to the first pedestrian crosswalk;
setting an area including the first pedestrian crosswalk and the second pedestrian crosswalk as a detection area of a detector detecting an object around the subject vehicle;
detecting the moving object in the detection area using the detector; and
controlling travel of the subject vehicle on a basis of a detection result of the detector.

6. The travel control method for a vehicle according to claim 5, comprising
specifying a pedestrian crosswalk to which a distance from the crossing position along the moving route of the moving object is the first distance or less as the second pedestrian crosswalk.

7. The travel control method for a vehicle according to claim 1, comprising detecting a moving object in the detection area using the detector; and controlling the travel of the subject vehicle on the basis of the detection result of the detector.

8. The travel control method for a vehicle according to claim 7, comprising calculating the first distance on a basis of a moving speed of the moving object.

9. The travel control method for a vehicle according to claim 7, comprising determining a partial area of the second pedestrian crosswalk as a target area;

setting an area including the target area as the detection area; and calculating a second distance on a basis of a moving speed of the moving object, the target area being a specific area located within the second distance from the crossing position, the specific area being included in an area of the second pedestrian crosswalk.

10. The travel control method for a vehicle according to claim 7, comprising:

determining a partial area of the second pedestrian crosswalk as a target area;

setting an area including the target area as the detection area; and when a determination is made that the moving object cannot cross the second pedestrian crosswalk due to a surrounding vehicle passing through the second pedestrian crosswalk, calculating a distance from the crossing position to a position on the second pedestrian crosswalk through which the surrounding vehicle passes as a second distance, the target area being a specific area located within the second distance from the crossing position, the specific area being included in an area of the second pedestrian crosswalk.

11. The travel control method for a vehicle according to claim 7, comprising:

determining whether or not the moving object can cross the second pedestrian crosswalk on a basis of a signal indication of a traffic signal for pedestrians at the second pedestrian crosswalk; and when a determination is made that the moving object cannot cross the second pedestrian crosswalk, excluding the second pedestrian crosswalk from the detection area.

12. A travel control apparatus for a vehicle, comprising:
a detector that detects an object around a subject vehicle; and
a controller that controls travel of the subject vehicle on a basis of a detection result of the detector, wherein the controller:

specifies a pedestrian crosswalk through which a subject vehicle is expected to pass as a first pedestrian crosswalk;

estimates a position on the first pedestrian crosswalk through which the subject vehicle passes as a crossing position in a length direction of the first pedestrian crosswalk;

determines whether or not another pedestrian crosswalk located within a predetermined first distance from the crossing position and located close to the first pedestrian crosswalk is specified as a second pedestrian crosswalk;

when the second pedestrian crosswalk is specified, sets an area combining the first pedestrian crosswalk and the second pedestrian crosswalk as an interpolation area; and sets an area including the first pedestrian crosswalk, the second pedestrian crosswalk, and the interpolation area as a detection area of the detector.

13. A travel control apparatus for a vehicle, comprising:
a detector that detects an object around a subject vehicle; and
a controller that controls travel of the subject vehicle on a basis of a detection result of the detector, wherein the controller:

specifies a pedestrian crosswalk through which the subject vehicle is expected to pass as a first pedestrian crosswalk;

estimates moving routes of a moving object moving toward the first pedestrian crosswalk on a basis of road configurations around the first pedestrian crosswalk;

estimates a position on the first pedestrian crosswalk through which the subject vehicle passes as a crossing position in a length direction of the first pedestrian crosswalk, the crossing position being a point of intersection between a planned travel route of the subject vehicle and a moving route of the moving object in the first pedestrian crosswalk;

specifies as a second pedestrian crosswalk another pedestrian crosswalk located within a predetermined distance from the crossing position along the moving route of the moving object moving toward the first pedestrian crosswalk and located close to the first pedestrian crosswalk;

sets an area including the first pedestrian crosswalk and the second pedestrian crosswalk as a detection area of the detector; and detects the moving object in the detection area.

* * * * *